(12) United States Patent
Kearns et al.

(10) Patent No.: US 7,785,094 B1
(45) Date of Patent: Aug. 31, 2010

(54) HIGH CAPACITY EXTRUSION DIE ASSEMBLY

(75) Inventors: Joseph P. Kearns, Overland Park, KS (US); Galen J. Rokey, Sabetha, KS (US); Philip B. Wiltz, Sabetha, KS (US); Anthony L. Bruning, Sabetha, KS (US); Lafe N Bailey, Morrill, KS (US)

(73) Assignee: Wenger Manufacturing, Inc., Sabetha, KS (US)

( * ) Notice: Subject to any disclaimer, the term of this patent is extended or adjusted under 35 U.S.C. 154(b) by 0 days.

(21) Appl. No.: 12/715,134

(22) Filed: Mar. 1, 2010

Related U.S. Application Data

(62) Division of application No. 12/539,393, filed on Aug. 11, 2009, now Pat. No. 7,691,427, which is a division of application No. 12/420,725, filed on Apr. 8, 2009, now Pat. No. 7,611,347.

(51) Int. Cl.
*B29C 47/40* (2006.01)

(52) U.S. Cl. ............................ 425/204; 366/85; 366/89; 425/208; 425/382 R; 425/382.2; 425/382.3; 425/464; 426/516

(58) Field of Classification Search .................. 99/353, 99/355; 426/440, 445, 446, 447, 448, 449, 426/450, 513, 516, 517, 519, 520, 523; 366/79, 366/81, 83, 84, 85, 88, 89, 241, 279, 290, 366/291, 292, 297, 298, 299, 301, 318, 323, 366/603, 257; 425/204, 205, 208, 378.1, 425/382 R, 382.2, 382.3, 461, 462, 463, 464, 425/465
See application file for complete search history.

(56) References Cited

U.S. PATENT DOCUMENTS 787,108 A   4/1905   Oliver (Continued)

FOREIGN PATENT DOCUMENTS

CH   644058   7/1984

(Continued)

OTHER PUBLICATIONS

Effects of Die Dimensions on Extruder Performance; Journal of Food Engineering; 1997; Sokhey A S; Ali Y; Hanna M A; Foodline.

(Continued)

*Primary Examiner*—Yogendra N Gupta
*Assistant Examiner*—Joseph Leyson
(74) *Attorney, Agent, or Firm*—Hovey Williams LLP

(57) ABSTRACT

High-capacity extrusion die assemblies (20, 90, 130, 140, 180, 252) each having a tubular section (44, 146, 162, 268) and an elongated, axially rotatable, helically flighted screw section (56, 56a, 152, 168, 276, 278) which cooperatively define frustoconical, outwardly diverging material flow paths (75, 160, 291) at constant or differing divergence angles of from about 1-11°. The use of diverging tubular sections (44, 146, 162, 268) and screw sections (56, 56a, 152, 168, 276, 278) permits the use of larger die plates (76, 118, 292) with an increased number of die openings (80, 124, 296). This allows significant increases in extrusion production rates. The die assemblies (20, 90, 130, 140, 180, 252) can be used in the production of a wide number of human foods or animal feeds, and particularly aquatic feeds of the floating or sinking variety. In another aspect of the invention, an extruder (210) is provided having diverging and converging sections (212, 214) along the length thereof and defining corresponding flow paths (230, 246).

18 Claims, 14 Drawing Sheets

U.S. PATENT DOCUMENTS

| | | | |
|---|---|---|---|
| 2,020,843 A | | 11/1935 | Lohner |
| 2,543,894 A | * | 3/1951 | Colombo .................... 425/204 |
| 2,686,336 A | | 8/1954 | Bernhardt et al. |
| 3,085,288 A | * | 4/1963 | Street .......................... 366/85 |
| 3,664,795 A | | 5/1972 | Heinz et al. |
| 3,698,693 A | | 10/1972 | Poncet |
| 3,728,053 A | | 4/1973 | Stillhard et al. |
| 3,749,374 A | | 7/1973 | Buchheit |
| 3,850,415 A | | 11/1974 | Hansen |
| 3,904,341 A | | 9/1975 | Putti |
| 4,039,691 A | | 8/1977 | Hildebolt |
| 4,055,681 A | | 10/1977 | Balaz et al. |
| 4,118,164 A | | 10/1978 | Wenger et al. |
| 4,125,635 A | | 11/1978 | de Ruyter |
| 4,168,942 A | | 9/1979 | Firth |
| 4,173,445 A | | 11/1979 | McKelvey et al. |
| 4,206,713 A | | 6/1980 | Ryason |
| 4,285,271 A | | 8/1981 | Falck et al. |
| 4,346,652 A | | 8/1982 | de Ruyter |
| 4,352,650 A | | 10/1982 | Marshall |
| 4,384,837 A | | 5/1983 | Murai et al. |
| 4,400,218 A | | 8/1983 | Koch et al. |
| 4,422,839 A | | 12/1983 | Przytulla et al. |
| 4,483,257 A | | 11/1984 | den Otter |
| 4,534,992 A | | 8/1985 | Taguchi et al. |
| 4,818,206 A | | 4/1989 | Maillefer |
| 4,836,460 A | | 6/1989 | Akazawa |
| 4,875,847 A | | 10/1989 | Wenger et al. |
| 4,886,440 A | | 12/1989 | Forrest et al. |
| 4,968,236 A | | 11/1990 | Martens |
| 4,978,077 A | | 12/1990 | Huebner et al. |
| 4,993,649 A | | 2/1991 | Koenig |
| 5,267,847 A | | 12/1993 | Bohm et al. |
| 5,458,836 A | | 10/1995 | Rakestraw et al. |
| 5,540,900 A | | 7/1996 | Poncet |
| 5,914,148 A | | 6/1999 | Kazemzadeh |
| 6,016,742 A | | 1/2000 | Hauck et al. |
| 6,051,267 A | | 4/2000 | Jury et al. |
| 6,074,084 A | | 6/2000 | Kolossow |
| 6,331,069 B1 | | 12/2001 | Putti |
| 6,485,287 B1 | | 11/2002 | Sugano |
| 6,491,510 B1 | | 12/2002 | Tieu et al. |
| 6,638,051 B2 | | 10/2003 | Yamaguchi et al. |
| 6,773,739 B2 | | 8/2004 | Hauck et al. |
| 6,808,375 B2 | | 10/2004 | Klotzer |
| 6,817,858 B2 | | 11/2004 | Howsam |
| 7,101,166 B2 | | 9/2006 | Yamaguchi et al. |
| 7,448,795 B2 | | 11/2008 | Wenger et al. |
| 2002/0062740 A1 | | 5/2002 | Brukov et al. |
| 2002/0098255 A1 | | 7/2002 | Ayash |
| 2006/0019009 A1 | | 1/2006 | Keller et al. |
| 2006/0280850 A1 | | 12/2006 | Epstein et al. |
| 2008/0111954 A1 | | 5/2008 | Hashimoto et al. |

FOREIGN PATENT DOCUMENTS

| | | |
|---|---|---|
| EP | 0041641 | 5/1981 |
| JP | 55013147 | 1/1980 |
| JP | 55097944 | 7/1980 |
| WO | WO 2009056083 | 5/2009 |

OTHER PUBLICATIONS

Influence of Extrusion Conditions on Extrusion Speed, Temperature, and Pressure in the Extruder and on Pasta Quality; Cereal Chemistry; 1994; Abecassis, J.; Abbou, R; Food Sci.&Tech.Abs.

Barrel-Valve Assembly: Its Influence of Residence Time Distribution and Flow Pattern in a Twin-screw Extruder; Transactions of the ASAE; 1994; Liang, M.; Hsieh, F; Agricola.

* cited by examiner

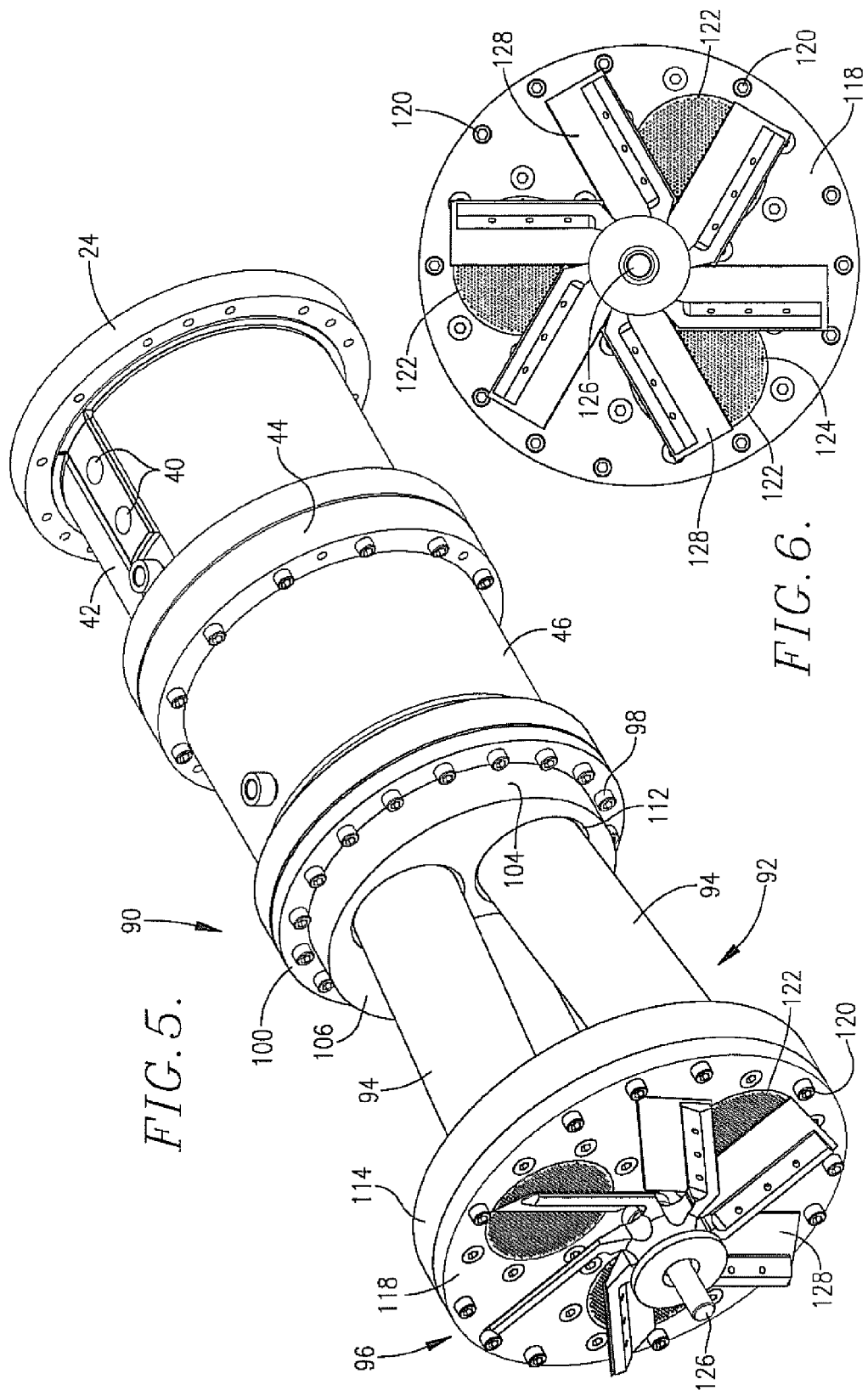

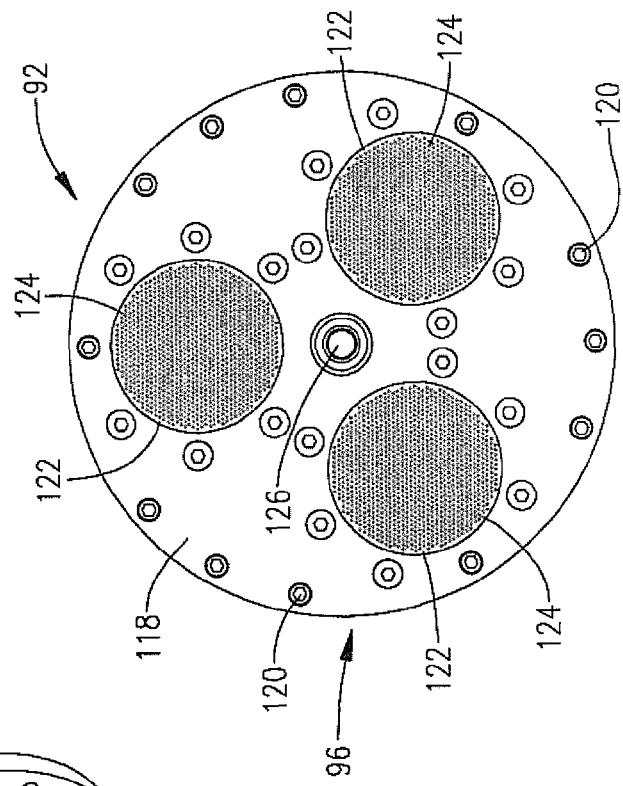
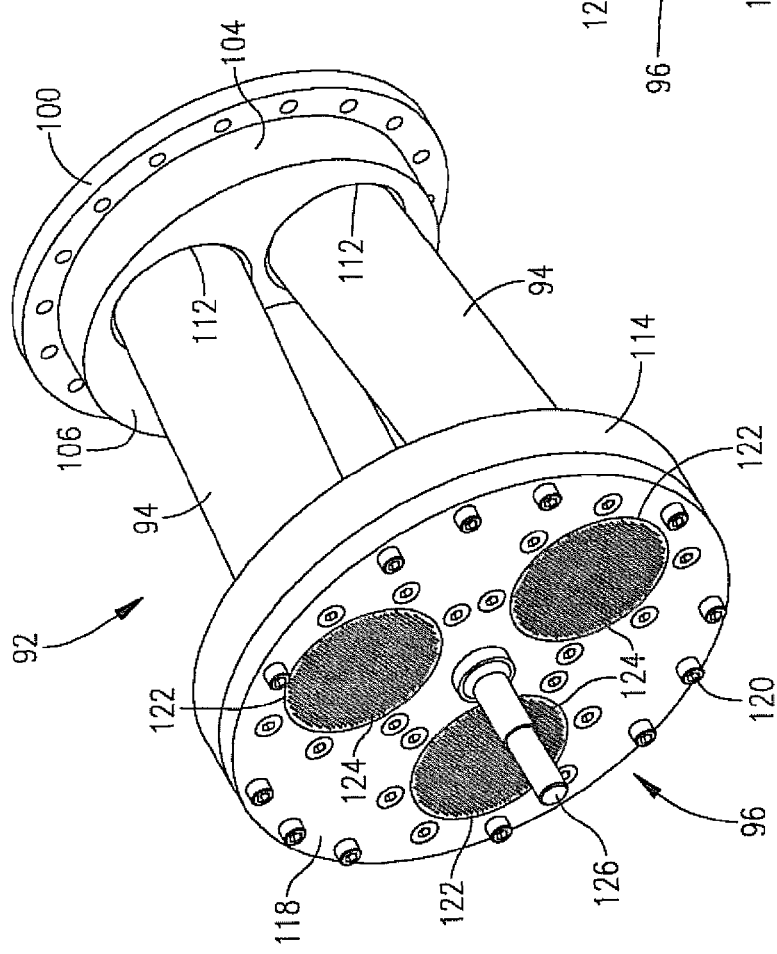

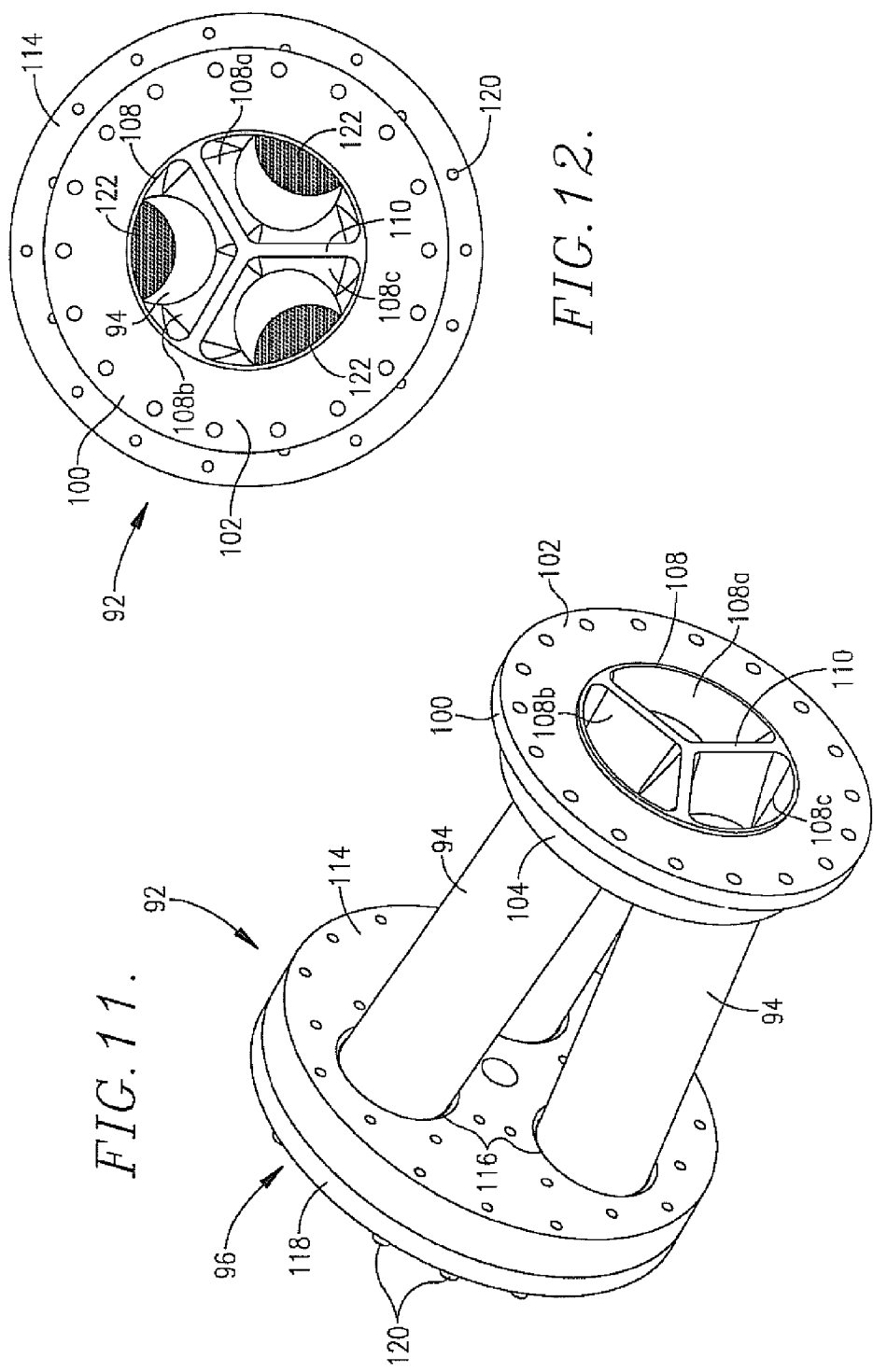

HIGH CAPACITY EXTRUSION DIE ASSEMBLY

CROSS REFERENCE TO RELATED APPLICATION

This is a division of application Ser. No. 12/539,393, filed Aug. 11, 2009, now U.S. Pat. No. 7,691,427, and entitled EXTRUSION DIE ASSEMBLY FOR HIGH DENSITY PRODUCTS, which is a division of identically titled application Ser. No. 12/420,725, filed Apr. 8, 2009, now U.S. Pat. No. 7,611,347, incorporated herein by reference.

BACKGROUND OF THE INVENTION

1. Field of the Invention

The present invention is broadly concerned with improved, high capacity die assemblies for use with single or twin extruders. More particularly, the invention is concerned with such die assemblies, extruders including the die assemblies, and corresponding methods wherein the die assemblies preferably include a tubular section having a progressively diverging bore, an axially rotatable flighted screw section also progressively diverging within the tubular section, and a die unit associated with the head and screw sections. The diverging construction of tubular and screw sections allows the use of larger area dies having a greater number of die openings therein to thus increase extrusion rates.

2. Description of the Prior Art

Extrusion processing of comestible products such as human foods and animal feeds has long been practiced and is a highly developed art. In general temis, food extruders of the single or twin screw variety are employed, having elongated, tubular barrels with inputs adjacent one end thereof and restricted orifice dies at the outlet thereof, and one or two helically flighted, rotatable screws within the barrel. In many instances steam is injected into the barrel during processing. An apertured die plate is operably coupled with the outlet end of the barrel in order to form the product as it emerges from the extruder. Depending upon the selected extrusion conditions, the final products may be fully or partially cooked, and can have varying degrees of expansion.

Many commercial extruders are designed with converging terminal screw sections sometimes referred to as "cone nose" sections. These screw sections are housed within a complementally converging barrel section. These converging extruder end assemblies are provided in order to increase the pressure and shear conditions within the extruder just upstream of the final extrusion die. Typical examples of these designs are found in U.S. Pat. Nos. 4,118,164 (single screw) and 4,875,847 (twin screw).

Referring to FIG. 18, conventional prior art food extrusion assemblies are generally made up of a serially interconnected preconditioner 10 and extruder 11, the latter having a multiple section barrel 12 terminating in a restricted orifice die 13, and one or two internal, helically flighted, axially rotatable screw(s) 14. The screw 14 includes an elongated central shaft 15 with helical flighting 16 along the length thereof. In many cases, the terminal head and screw sections 17 and 18 are of converging, frustoconical design in order to increase the pressure and shear conditions within the barrel just upstream of die 13.

In operation, a comestible material (usually a mixture of ingredients including quantities of protein, starch and fat) is fed into preconditioner 12 where it is initially moisturized by the addition of steam and/or water and heated to partially cook the material. The preconditioned material is then delivered to the extruder 11 where the action of the rotating screws(s) 14 serves to convey the material toward and through die 13. During this conveyance, the material is subjected to increasing levels of temperature, pressure and shear, in order to cook the material to the desired degree. As the material emerges from the die 13, it is formed as a final product and may undergo expansion as a result of flash-off of moisture from the material. The degree of expansion is a controlled phenomenon, and is influenced by the amount of energy imparted to the material within the barrel 12 and the geometry of the final die 13.

These food extruder systems have been used for decades to produce a wide variety of human foods and animal feeds. However, it has been found that the frustoconical end configuration of the terminal barrel and screw sections 17 and 18 may limit the rate of production achievable with such extrusion assemblies. Specifically, owing to the fact that the terminal barrel and screw sections converge, the die 13 necessarily has a reduced surface area, and hence can only have a certain number of restricted die openings therein. Indeed, this limitation on the number of available die openings is the limiting factor in production rates for some products such as small diameter or micro-aquatic feeds.

For example, using a typical Wenger Model X165 single screw extruder for the production of micro-aquatic feeds having a diameter of up to 2 mm, the maximum throughput is on the order of 1-1.5 tons/hr, and this rate limitation is attributable to the presence of only a small number of die holes.

Other conventional extruder designs are disclosed in U.S. Pat. Nos. 3,728,053; 3,904,341; 4,346,652; 4,352,650; 4,400,218; 4,422,839; 4,836,460; 5,458,836; 6,074,084; 6,331,069; 6,491,510; 7,101,166; Japanese Patent No. JP 55013147; Non-Patent Literature: Effects of Die Dimensions on Extruder Performance; Sokhey A S; Ali Y; Hanna M A; Foodline; Influence of Extrusion Conditions on Extrusion Speed, Temperature, and Pressure in the Extruder and on Pasta Quality; Abecassis, J.; Abbou, R; Food Sci.&Tech.Abs; and Barrel-Valve Assembly: Its Influence of Residence Time Distribution and Flow Pattern in a Twin-screw Extruder; Liang, M.; Hsieh, F; AGRICOLA.

SUMMARY OF THE INVENTION

The present invention overcomes the problems outlined above, and provides high capacity extrusion die assemblies for use with single or twin screw extruders. Generally speaking, the die assemblies include an elongated tubular section having an axial length, a smaller diameter inlet end and a larger diameter outlet end, with an internal bore progressively diverging at an angle of from about 1-11° (more preferably from about 1.5-7 and most preferably from about)2-4° in a direction from the inlet end towards the outlet end. An elongated, axially rotatable screw section is located within the tubular section and has an axial screw length with a smaller diameter inlet end proximal to the tubular section inlet end and a larger diameter outlet end proximal to the tubular section outlet end. The screw section includes an elongated shaft with outwardly extending helical flighting presenting flighting outer surfaces along the length of the shaft, the flighting outer surfaces progressively diverging at an angle of from about 1-11° (more preferably from about 1.5-7° and most preferably from about)2-4° in a direction from the inlet end toward the outlet end. A die unit associated with the tubular section outlet end and has a plurality of die openings therethrough configured to create a pressure drop across the die openings during extrusion operations.

Thus, in preferred forms the mating tubular and screw sections define an outwardly diverging flow path having the aforementioned divergence angle which is generally frustoconical in overall shape. Consequently, the die unit can have a larger overall area as compared with the prior art, so that more die openings can be provided to increase extruder capacity.

Although the tubular and screw sections are preferably formed with gradually and progressively diverging defining surfaces throughout the entire axial lengths thereof, in certain instances the divergence need not be throughout the entirety of these sections. More generally, the tubular and screw sections should have diverging surfaces over at least about 50% of the lengths thereof, and more preferably at least about 75% of the lengths thereof. Additionally, while in certain embodiments the divergence angles of the tubular and screw sections are the same, in other cases these angles may be different. Also, respective portions of the tubular and screw sections may be of different divergence angles. For example, a given portion of the die assembly may have a relatively small divergence angle while a downstream portion of the die assembly may be configured with a larger divergence angle.

In preferred forms, the tubular section of the die assembly is made up of a cylindrical body with a replaceable internal sleeve having a desired diverging surface, so that the body and sleeve cooperatively define the overall head section. In other cases, however, a unitary tubular section can be used.

Where the die assemblies of the invention are used for the production of low density products such as floating microaquatic feeds, the die unit comprises a die plate which is located in close proximity to the end of the screw section. This is to avoid a situation where the material being processed is allowed to densify prior to passage through the die plate.

On the other hand, where the die assemblies are employed in the production of high density products such as sinking aquatic feeds, the die plate is spaced a significant distance from the terminal end of the screw section. Advantageously, in such dies a plurality of obliquely oriented, structurally distinct and separate material flow tubes are positioned at the outlet of the screw section, and a die plate is mounted at the other end of the flow tubes.

Indeed, with the use of such oblique flow tubes, adequate divergence can be obtained without the use of the upstream diverging tubular and screw sections, or for that matter even without the use of a final screw section. Thus, such high product density die assemblies preferably include an elongated tubular section presenting a longitudinal axis and having an axial length and a bore with an inlet end and an outlet end, with a manifold operably coupled with the tubular section outlet end in order to receive material from the outlet end. A plurality of tubular extensions are secured to a manifold and are configured to receive material from the manifold, each of the extensions being oriented at an oblique angle relative to the longitudinal axis of the tubular section. A die is operably coupled with each of the extensions adjacent the ends thereof remote from the manifold and including a plurality of die openings oriented to create a pressure drop across the die openings during extrusion operations. Each of the extensions is independently oriented at an angle of from about 2-12°, more preferably from about 4-10° relative to the longitudinal axis of the tubular section.

In preferred practice however, the upstream tubular section adjacent the manifold is equipped with an axially rotatable screw section, and the upstream tubular and screw sections are as described above, i.e., these have a diverging construction to present a generally frustoconical flow path through these sections.

The die assemblies create methods of extruding materials from an extruder barrel comprising the steps of moving material under pressure along a progressively diverging, generally frustoconical path of travel defined between a stationary tubular section having an axial length with an internal bore presenting a smaller diameter inlet end and a larger diameter outlet end, and an axially rotating, helically flighted screw section within the bore. The path of divergence corresponds with the divergence angle of the tubular and screw sections, and is generally from about 1-11° (more preferably from about 1.5-7° and most preferably from about)2-4° in a direction from the inlet end toward the outlet end. The path of travel may progressively diverge over substantially the entirety of the bore axial length, but in any event should progressively diverge over at least about 50% of such axial length. After traveling along the flow path the material passes through a plurality of restricted orifice die openings so as to create a pressure drop across the die openings.

As noted previously, where the die assemblies are designed for production of low density products, the die is closely adjacent the terminal end of the screw section. Where high density products are desired and use is made of the diverging flow tubes, the material is forced through these tubes by the action of the extruder in order to allow the material to cool and densify in the tubes prior to extrusion.

In another aspect of the invention, improved extruders are provided having alternating diverging and converging sections along the length thereof. Such an extruder includes an elongated tubular barrel presenting an inlet end and an outlet end, and an elongated, axially rotatable, helically flighted screw within the barrel and operable to move the material from the inlet toward and through the outlet under pressure. A die assembly is coupled to the outlet end of the barrel and presents a plurality of die holes therethrough configured to create a pressure drop across the die openings during passage of the material through the openings. The extruder barrel has first and second sections along the length thereof, wherein the first section having a first generally frustoconical bore with the large end thereof proximal to the inlet end and the small end thereof proximal to the outlet end. The second section has a second generally frustoconical bore with the large end thereof proximal to the outlet end and the small end thereof proximal to the inlet end. The screw assembly also has first and second sections along the length thereof and correspondingly received within the first and second tubular sections. The first screw section is of generally frustoconical configuration and in alignment with the first tubular section, and the second screw section of generally frustoconical configuration in alignment with the second tubular section. Accordingly, the first tubular section and the first screw section cooperatively defining a converging material flow path along the length thereof and towards the outlet end, and the second tubular section and the second screw section cooperatively defining a diverging material flow path along the length thereof and towards the outlet end. The alternating converging and diverging extruder sections may be spaced apart along the length of the barrel, but are preferably adjacent one another.

A conventional die plate may be used with the extruders of the invention. However, to obtain the maximum benefit of the invention, the improved die assemblies hereof are used with the extruders.

BRIEF DESCRIPTION OF THE DRAWINGS

FIG. 5 is a perspective view of another die assembly in accordance with the invention for the production of high density extrudates, coupled to the outlet end of an extruder barrel and depicting a cut-off knife adjacent the die face;

FIG. 6 is an end view of the assembly illustrated in FIG. 5;

FIG. 9 is a perspective view of the die assembly of FIG. 5, shown separate from an extruder barrel and without a cut-off knife;

FIG. 10 is an end view of the die assembly of FIG. 9;

FIG. 11 is a perspective view of the die assembly of FIG. 9, from the opposite end thereof as illustrated in FIG. 9;

FIG. 12 is an end view of the FIG. 9 die assembly, illustrating the end opposite that shown in FIG. 10;

DETAILED DESCRIPTION OF THE PREFERRED EMBODIMENT

Embodiment of FIGS. 1-4

Figure 1:
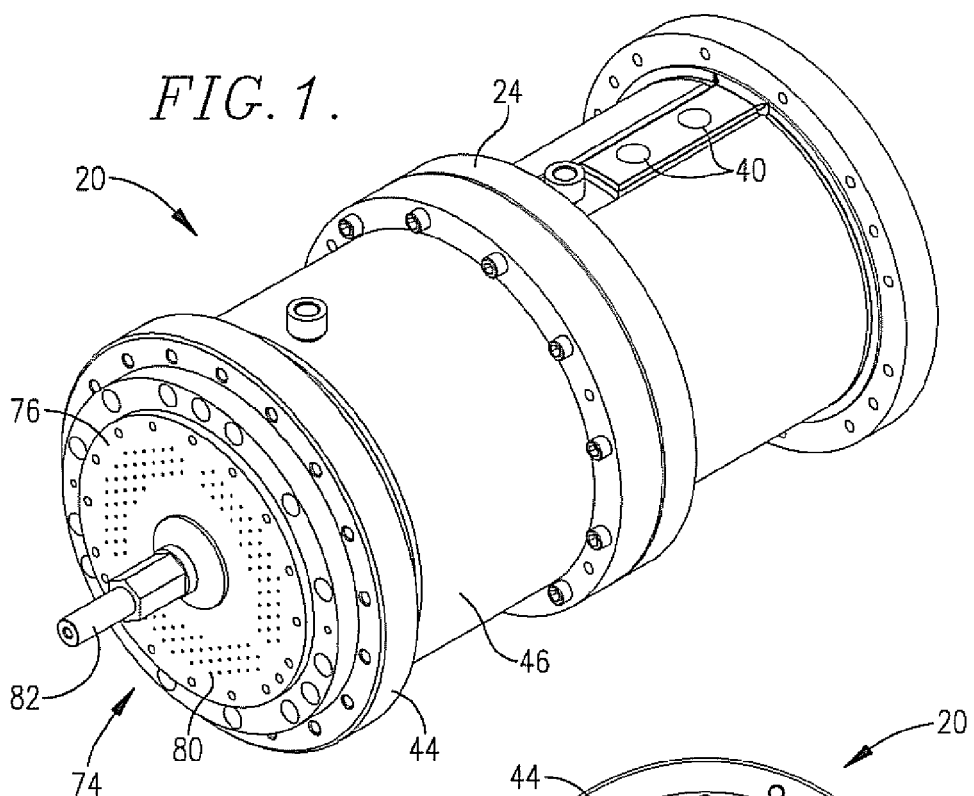
FIG. 1 is a perspective view of a die assembly in accordance with the invention for the production of low density extrudates, coupled to the outlet end of an extruder barrel.
Figure 2:
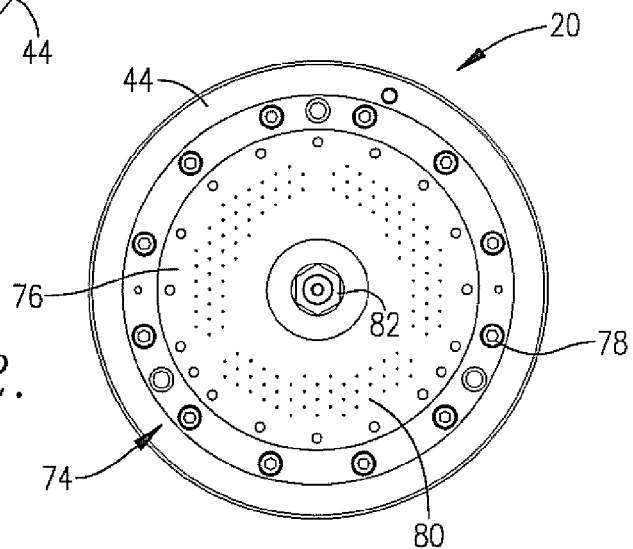
FIG. 2 is an end view of the assembly illustrated in FIG. 1.
Figure 18:
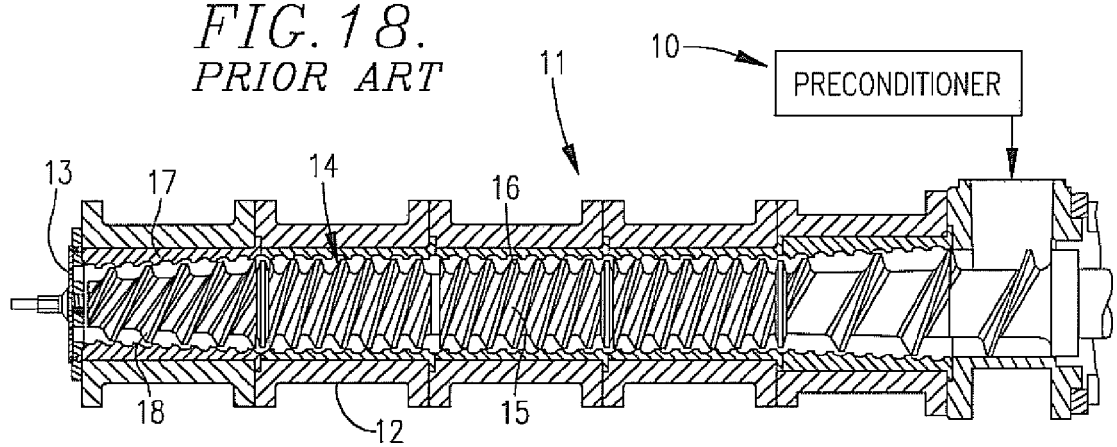
FIG. 18 is a vertical sectional view of a typical prior art preconditioner/extruder assembly.

Extrusion Die Assembly for the Production of Low Density Products

Turning now to FIGS. 1-4, a die assembly 20 is illustrated, attached to the end of a conventional single screw extruder not having a converging end section. The extruder is made up of a plurality of tubular, end-to-end interconnected head sections defining a stationary tubular barrel having an inlet and terminating in a final outlet head section 24. An elongated, multiple-section, helically flighted, axially rotatable screw assembly is positioned within the barrel and terminates in a final screw section 30 within final head section 24; the screw assembly is operable to move material from the inlet end of the barrel toward and through the outlet end thereof. The screw sections each include a central shaft 32 and a plurality of outwardly extending helical flights 34. The shafts 32 are in turn mounted on a central drive shaft 36 which is coupled with a rear motor and drive assembly (not shown), for rotation of the shaft 36 without translatory movement thereof, best seen in FIG. 4, the head sections making up the extruder barrel may be equipped with internal, straight or helically ribbed sleeves 38 cooperatively defining an elongated bore 39 along the length of the barrel. The tubular sections may have ports 40 for injection of steam and/or water into the barrel 26. Additionally, these sections may have ported external jackets 42 to allow indirect heat exchange control of the temperature within the barrel through use of water or steam injection.

The die assembly 20 is mounted on final head 24 and includes a tubular section 44 having a heat exchange jacket 46. The tubular section 44 also has an internal, helically ribbed sleeve 48 which defines an internal frustoconical bore 50 in communication with bore 39. It will be observed that the bore 50 has an inlet end 52 of relatively small diameter and an outlet end 54 of relatively large diameter, and a gradually and progressively diverging bore-defining wall surface 55 extending from inlet end 52 to outlet end 54. The length/diameter (L/D) ratio of tubular section 44, namely the ratio of the axial length of the tubular section 44 divided by the inner diameter of the small inlet end 52, is about 2.03. In general, with the die assemblies of this embodiment the L/D ratio should be from about 1.5-4, more preferably from about 2-3.

The die assembly 20 also has a screw section 56 within tubular section 44 and secured to a reduced diameter drive shaft extension 58 by means of bolt 60. The screw section 56 includes a shaft 62 and outwardly extending helical flighting 64. The screw section 56 also presents an inlet end 66 adjacent final screw section 30 and an opposed outlet end 68. The shaft 62 has an outer defining surface 70 which diverges from inlet end 66 to outlet end 68. Similarly, the flighting 64 presents flighting outer surfaces 72 which also diverge in the same fashion as surface 70. In this embodiment, the surfaces 55, 70 and 72 diverge at a constant angle of 3°, and cooperatively define a generally frustoconical flow path 75 from the inlet ends 52 and 66 to the outlet ends 54 and 68. In practice, divergence angles of from about 1.5-7°, and more preferably from about 2-6°, have been found to be suitable.

The die assembly 20 also has a die unit 74 in the form of a die plate 76 secured to tubular section 44 by means of bolts 78. The die plate 76 has a plurality of restricted orifice die openings 80 arranged in a generally circular pattern so as to be in direct communication with the outlet end of flow path 75, and to create a pressure drop across the openings 80 during extrusion. The die plate 76 is also equipped with a central stub shaft 82 to facilitate mounting of a rotatable knife (not shown) adjacent the outlet face of the die plate 76. In this embodiment, the die plate 76 is closely adjacent the outlet end 68 of screw section 56 which is significant in the production of low density extrudates. Generally, the die plate 76 should be positioned at a distance of from about 0.5-2 inches from the outlet end 68, or more generally at a distance less than the diameter of die plate 76.

In the production of low density extrudates using die assembly 20, a starting mixture is passed into and through the extruder barrel and ultimately through die assembly 20. During such passage, the screw assembly and die screw section 56 are rotated by shaft 36. If desired, steam and/or water may be injected into the barrel 26 via ports 40, and further temperature control may be achieved by passing cold water or steam through the jackets 42. This has the effect of subjecting the starting mixture to increasing levels of temperature, pressure and shear in order to cook the mixture to the desired extent. The material passing from barrel 26 is conveyed along the diverging, generally frustoconical flow path 75 towards and through the die openings 80. The extrusion parameters (e.g., SME, STE, and extruder configuration) are maintained so as to impart significant energy to the material in order to increase the degree of expansion of the product as it emerges from the die openings 80.

A variety of low density extrudates can be produced using the die assembly 20. A prime example of such a product is floating fish feeds designed to largely float at or near the surface of water. In the production of such feeds, the starting mixtures would typically contain one or more grains (e.g., corn, wheat, oat, milo, soy) as well as proteinaceous materials such as fish meal. The starting mixture would normally be initially processed and moisturized in a preconditioner such as a Wenger DDC preconditioner or a preconditioner as disclosed in U.S. Pat. No. 7,448,795. In the extruder, the following conditions are typical: residence time of the material being processed within the extruder barrel of from about 3-20 seconds, more preferably from about 4-10 seconds; extruder screw speeds of from about 250-900 rpm, more preferably from about 400-800 rpm; maximum temperature of material being processed within the barrel, 100-150° C., more preferably from about 110-125° C.; maximum pressure within the barrel of from about 100-2000 psi, more preferably from about 400-800 psi. In such processing the material may be cooked (as measured by extent of gelatinization of starch-bearing ingredients) to any desired level, but usually cook levels of at least about 75%, more preferably from about 75-98% are achieved. The floating fish feeds usually contain from about 18-36% by weight protein, from about 2-5% by weight fat, and from about 20-50% by weight starch, and have as-extruded moisture levels of from about 21-23% by weight, and wet product densities of from about 410-460 g/l.

It has been found that use of die assembly 20 overcomes the limitation on production experienced with conventional extrusions systems, in that the die plate 76 has a much larger number of die openings 80 as compared with the typical smaller die plates 13. Indeed, production rates are very significantly enhanced, often by a factor of three or more, without any loss in product quality.

Embodiment of FIGS. 5-12

Extrusion Die Assembly for the Production of High Density Products

FIG. 5 illustrates a die assembly 90 operably coupled with the final head section 24 of an extruder, as in the case of the first embodiment. The die assembly 90 includes a tubular section 44 and screw section 56, again as set forth in the first embodiment. Inasmuch as the sections 24 and 44, and the screw sections 30 and 56, are identical with the earlier embodiment, like reference numerals have been used in FIGS. 5-12 and no further discussion of these components is required.

The overall die assembly 90 has, in addition to the previously noted tubular section 44 and screw section 56, a manifold 92, oblique extension tubes 94, and a final die unit 96.

The manifold 92 is secured to the butt end of tubular section 44 by means of bolts 98 and includes a main body 100 having a rear wall 102, forwardly extending annular wall 104 and outer wall 106. As best seen in FIGS. 11 and 12, the rear wall 102 has a central opening 108 which communicates with frustoconical flow path 75. A somewhat Y-shaped divider 110 extends between the walls 102 and 106 and serves to divide the opening 108 into three equal area sections 108a, 108b, 108c. The outer wall 106 has three equidistantly spaced, circularly arranged openings 112 which respectively communicate with the sections 108a, 108b, 108c. An extension tube 94 is secured within each opening 112 which serves to orient the tubes at an oblique angle relative to the central longitudinal axis of the body 100. In the illustrated design, each of the tubes 94 is oriented at approximately a 6° angle of divergence from this axis; more generally a divergence angle of from about 2-12° and more preferably from about 4-10°, is suitable. The tubes 94 may be of variable length, but generally have an axial length of from about 6-24 inches.

Figure 8:
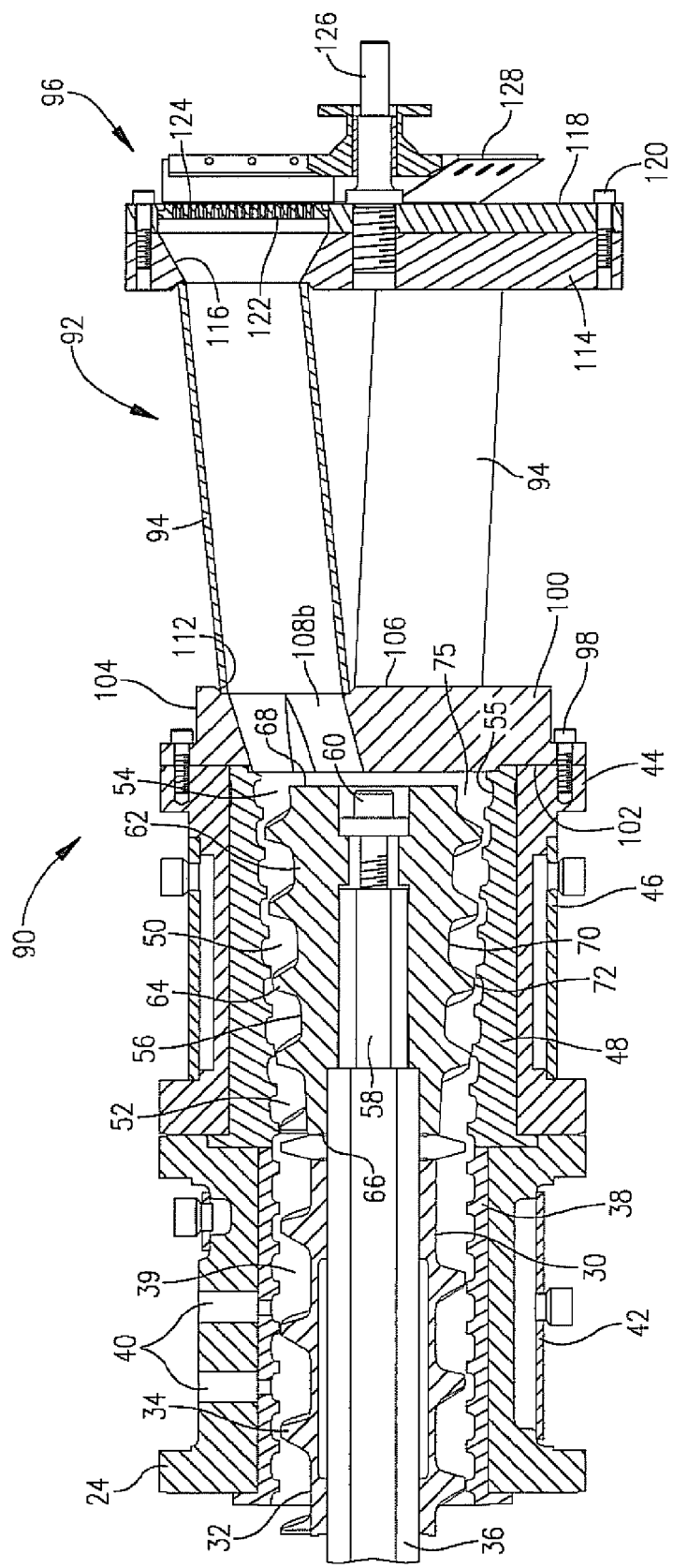
FIG. 8 is a vertical sectional view of the assembly of FIG. 5.

The die unit 96 is secured to the tubes 94 adjacent the ends thereof remote from body 100. In particular, the die unit 96 includes a main body 114 having three equally circumferentially spaced, frustoconical bores 116 therethrough. As best seen in FIG. 8, the outboard ends of the tubes 94 are respectively received within the bores 116. A die plate 118 is secured to the outer face of main body 114 by bolts 120. The die plate 118 has three die sections 122 respectively covering the outer ends of the bores 116. Each of the die sections 122 has a series of restricted die openings 124 therethrough, which create a pressure drop across the openings during extrusion. A mounting stub shaft 126 extends through plate 118 and is secured within body 114. The stub shaft 126 permits mounting of a rotatable cutting knife 128.

In preferred fowls, the tubes 94 are circular in cross section and are arranged in a substantially circular array. However, the invention is not so limited and the tubes can have different cross sectional shapes and can be arrayed differently. Where the term "diameter" is used with respect to the tubes 94, this is intended to denote the largest cross section dimension where non-circular tubes are employed. In addition, it is preferred that the tubes 94 be static, i.e., they do not include any moveable components along the lengths thereof, and have a constant shape and diameter along these lengths. Preferably, the length/diameter (L/D) ratio for the tubes 94 is from about 2-8, more preferably about 3-5, and most preferably about 3.75. It is also preferred that the tubes be separate and out of communication with each other at the ends thereof adjacent the outer apertured die sections 122. This is to be contrasted with a situation where separate flow paths are provided in which the material from the respective flow paths is recombined prior to extrusion thereof.

During extrusion using die assembly 90, the preconditioned material fed into the extruder barrel is subjected to increasing levels of shear, temperature, and pressure, and passes from the extruder barrel into manifold 92 where the material is separated into three streams owing to the presence of the diverter 110. These individual streams are then forced through the separate, structurally distinct tubes 94 towards and through die sections 122 of die plate 118. As such, the material passes through fully separate, mutually diverging paths of travel. During the travel through the tubes 94, the material is densified and cooled so that the final extrudates have a relatively high density. Moreover, the tubes 94 result in longer retention times and thus more cook for the product, as compared with conventional dies. The use of the manifold 92 and the separate tubes 94 in place of a single, large tube or extension having the same total cross sectional area results in a higher pressure drop across the dies, thus creating a denser product. Of course, the operating conditions of the extruder are maintained so that excess expansion upon extrusion is avoided. In general, the conditions specified above for the first embodiment may be followed with die assembly 90.

A principal use for die assembly 90 is in the production of sinking fish feeds which are designed to descend in water at controlled rates (e.g., slow- and fast-sinking feeds) which are optimum for specific species of fish. Common slow-sinking fish feeds have protein levels of from about 26-45% by weight, fat levels of from about 20-40% by weight, and starch levels of from about 5-15% by weight. Correspondingly, the denser fast-sinking feeds usually have protein levels of from about 26-48% by weight, fat levels of from about 18-26% by weight, and starch levels of from about 10-15% by weight. The as-extruded moisture levels of the slow- and fast-sinking fish feeds are from about 18-22% by weight and 26-28% by weight, respectively. The wet products have densities of from about 510-570 g/l (slow-sinking) and 600-650 g/l (fast-sinking). Another type of dense aquatic feed which can be produced by die assembly 90 is shrimp feed, which usually has from about 22-32% by weight protein, 2-6% by weight fat, and 12-26% by weight starch. These products have an as-extruded moisture level of from about 27-31% by weight and a wet product density of from about 660-720 g/l.

Figures 13, 14:
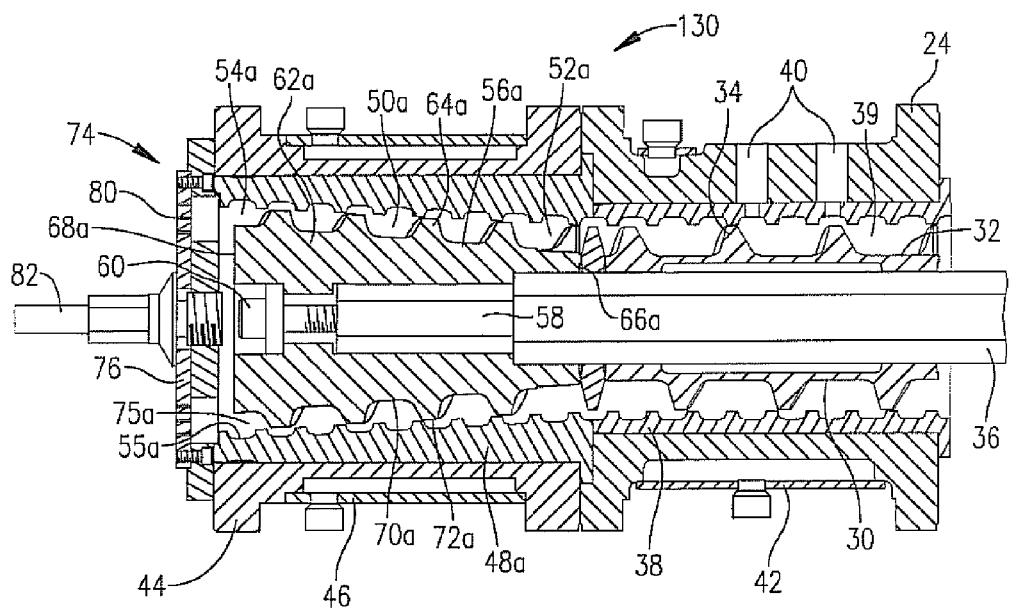
FIG. 13 is a vertical sectional view of another die assembly mounted on the end of an extruder barrel, and having a variable depth, decreasing volume screw as a part of the die assembly.
FIG. 14 is a vertical sectional view of another die assembly having a pair of aligned, diverging screw sections, wherein the terminal screw section adjacent the die has a greater angle of divergence than the adjacent screw section.

Embodiment of FIG. 13

Extrusion Die Assembly for the Production of High Density Products with a Variable Depth, Decreasing Volume FIG. 13 illustrates an alternate die assembly 130, again illustrated as mounted on the final head section 24 of an extruder. The illustrated extruder barrel and screw components are identical to that of FIG. 4, and like reference numerals have therefore been used. The die assembly 130 also includes many of the same components as die assembly 20, and identical components are numbered as in FIG. 4, and similar but differently components have the same reference numerals as in FIG. 4 except for the provision of an "a" distinguishing identifier. The die assembly 130 differs from die assembly 20 in that the latter had a constant free volume along the length thereof, whereas die assembly 130 has a variable flighting depth and decreasing free volume along its length. This is achieved by different relative geometries of the tubular and screw sections.

The die assembly 130 is mounted on final head 24 and includes a tubular section 44 having a heat exchange jacket 46. The tubular section 44 also has an internal, helically ribbed sleeve 48a which defines an internal frustoconical bore 50a in communication with bore 39. It will be observed that the bore 50a has an inlet end 52a of relatively small diameter and an outlet end 54a of relatively large diameter, and a gradually and progressively diverging bore-defining wall surface 55a extending from inlet end 52a to outlet end 54a.

The die assembly 130 also has a screw section 56a within tubular section 44 and secured to a reduced diameter drive shaft extension 58 by means of bolt 60. The screw section 56a includes a shaft 62a and outwardly extending helical flighting 64a. The screw section 56a also presents an inlet end 66a adjacent final screw section 30 and an opposed outlet end 68a. The shaft 62a has an outer defining surface 70a which diverges from inlet end 66a to outlet end 68a. Similarly, the flighting 64a presents flighting outer surfaces 72a which also diverge. In this embodiment, the surfaces 55a and 72a each diverge at a constant angle of 3°. However, the flighting depth of screw section 56a decreases from the inlet end 66a to the outlet end 68a thereof. "Flighting depth" refers to the distance between the outer flighting surfaces 72a and the defining outer surface of the shaft 62a. A consideration of FIG. 3 will demonstrate that screw section 56 of die assembly 20 has a constant flight depth, whereas the flighting depth of screw section 56a decreases as explained. In this design, the angle of divergence of the surface 70a is 6°, whereas the angle of divergence of the surfaces 72 is 3°. The die assembly 130 also has a die unit in the form of a die plate 76 identical with that of FIG. 3.

The FIG. 13 embodiment may be used in the production of very low density floating fish feeds. The decreasing flight depth and free volume within the die assembly 130 imparts more energy into the material being extruded.

Embodiment of FIG. 14

Extrusion Die Assembly Having a Pair of Interconnected Tubular and Screw Sections with Different Angles of Divergence FIG. 14 illustrates a die assembly 140 which includes a pair of interconnected sections 142 and 144. Although not shown, the section 142 is connected to the terminal section 24 of an extruder barrel. The section 142 includes a tubular section 146 similar to tubular section 44. The tubular section 146 has an internal, helically ribbed sleeve 148 presenting an outer surface 150. The section 142 also has an elongated, helically flighted, axially rotatable screw section 152 therein, including a progressively tapered shaft 154 and outwardly extending helical flighting 156 presenting outermost flighting surfaces 158. The tubular section 146 (owing to the presence of the sleeve 148) and screw section 152 have corresponding, smaller diameter inlet ends 146a, 152a, and larger diameter outlet ends 146b, 152b. Accordingly, the tubular section 146 and screw section 152 cooperatively define a generally frustoconical flow path 160 along the length thereof. In the illustrated embodiment, both of the surfaces 150 and 158 are oriented at a constant divergence angle of 3°.

The second or terminal section 144 also has a tubular section 162 equipped with an internal, helically ribbed sleeve 164 presenting an outer surface 166. The section 144 also has an elongated, helically flighted, axially rotatable screw section 168 therein, including a progressively tapered shaft 170 and outwardly extending helical flighting 172 presenting outermost flighting surfaces 174. The tubular section 162 (owing to the presence of sleeve 164) and screw section 168 have corresponding, smaller diameter inlet ends 162a, 168a, and larger diameter outlet ends 162b, 168b. Accordingly, the tubular section 162 and screw section 168 cooperatively define a generally frustoconical flow path 176 along the length thereof. Both of the surfaces 166 and 174 are oriented at a constant divergence angle of 6°.

Figure 15:
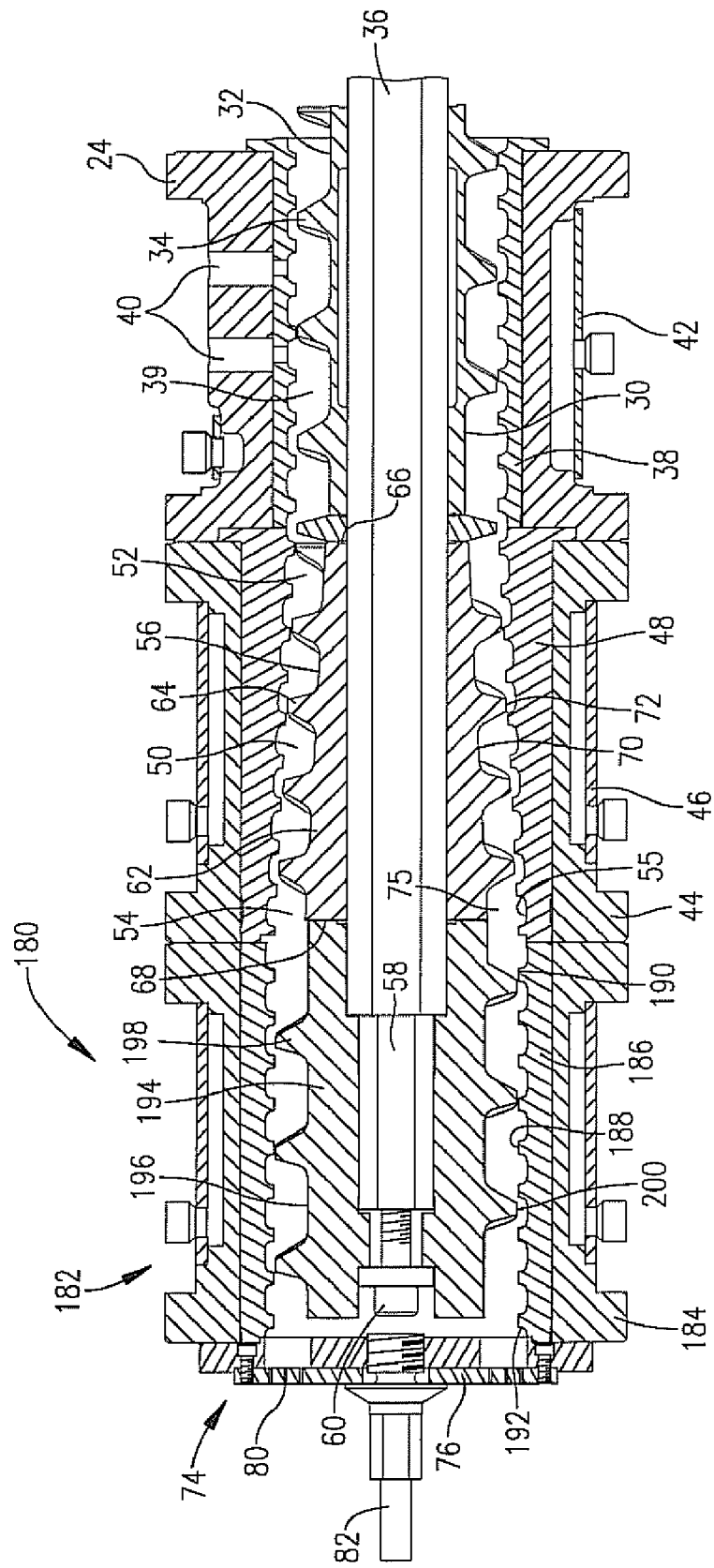
FIG. 15 is a vertical sectional view of an extruder and die assembly wherein the terminal screw section of the die assembly is straight and the adjacent screw section is of diverging configuration.

Embodiment of FIG. 15

Extrusion Die Assembly Having a Straight Terminal Section

FIG. 15 depicts a die assembly 180 having all of the components of die assembly 20, with the addition of a straight terminal section. Accordingly, the components of assembly 180 identical with those of die assembly 20 are identically numbered.

Figure 3:
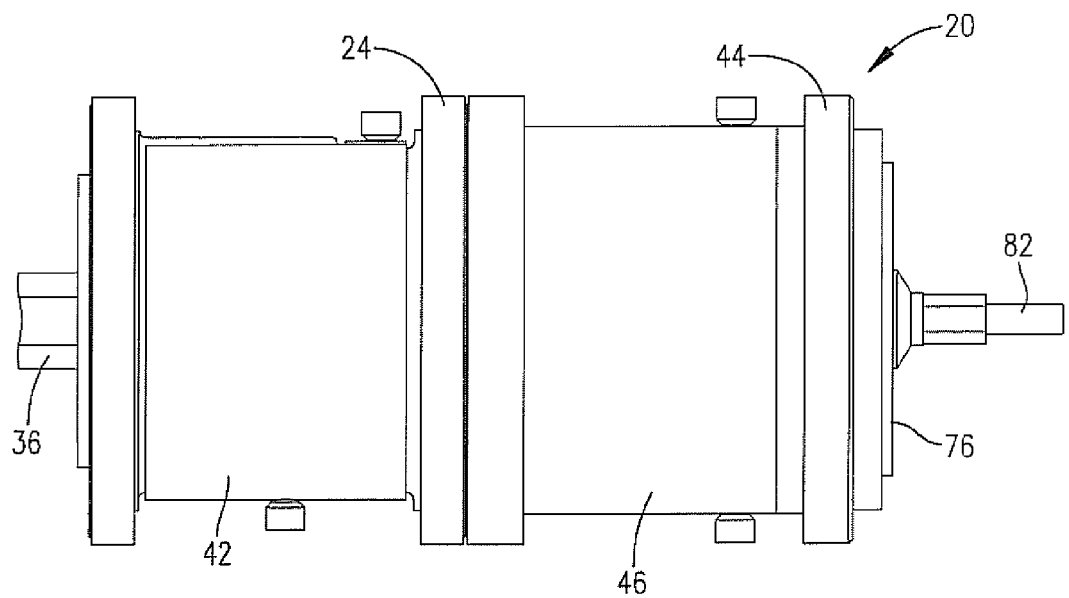
FIG. 3 is a side view with parts broken away of the assembly illustrated in FIG. 1.

Additionally, the die assembly 180 includes a straight section 182 secured to the outlet end of tubular section 44. The section 182 has a tubular section 184 with a ribbed internal sleeve 186 having an inner surface 188. In this instance, the inlet and outlet ends 190, 192 of the tubular section 184 are of the same size, and the surface 188 does not diverge. The section 182 also has an elongated, helically flighted, axially rotatable screw section 194 therein, having a shaft 196 and helical flighting 198 presenting flighting outer surfaces 200. It will be seen that the surfaces 188 and 200 are each straight in that they have a zero angle of divergence. A die plate 76 identical to that of FIG. 3 is mounted on the outlet end of tubular section 184 as illustrated.

Figure 16:
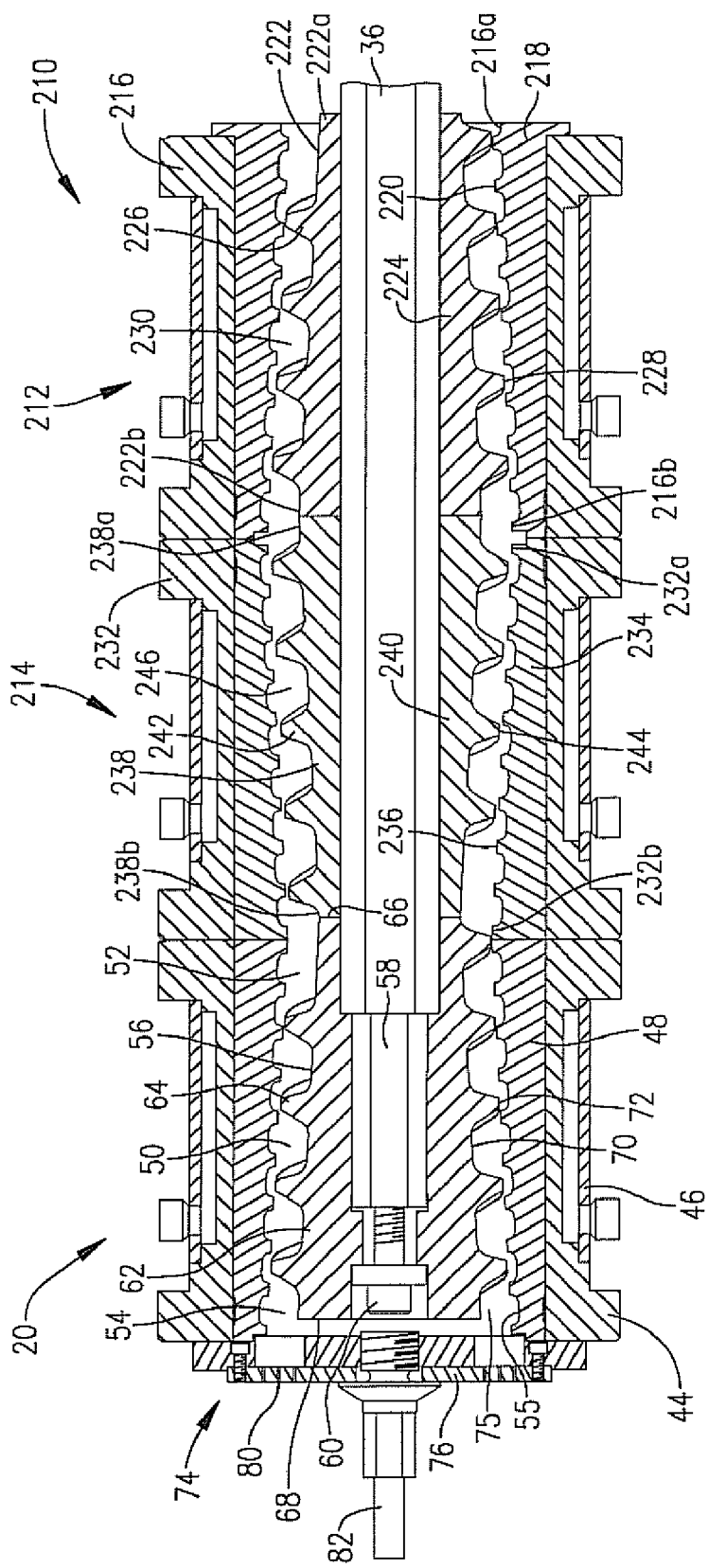
FIG. 16 is a vertical sectional view of an extruder and die assembly wherein the terminal screw section of the die assembly is of diverging configuration and the adjacent screw section is of converging configuration.

Embodiment of FIG. 16

Extruder and Die Assembly Having Alternating Diverging and Converging Sections

FIG. 16 illustrates a situation where an extruder 210 is provided having alternating diverging and converging sections, with a final die assembly 20. Again, the die assembly 20 is identical with that described in the first embodiment and like reference numerals are used in FIG. 16. However, the upstream extruder sections leading to die assembly 20 have a diverging section 212 and a converging section 214. The diverging section 212 has a tubular head 216 with an internal, helically ribbed sleeve 218 presenting an inner surface 220. An elongated, helically flighted, axially rotatable screw section 222 is located within head section 216 and has a central shaft 224 with helical flighting 226 presenting flighting surfaces 228. The inlet ends 216a, 222a and outlet ends 216b, 222b of head section 216 (because of the presence of sleeve 218) and screw section 222 are respectively of smaller and larger diameter, so as to cooperatively define a generally frustoconical and diverging flow path 230 along the length of section 212.

The converging section 214 has tubular head section 232 with an internal, helically ribbed sleeve 234 presenting an innermost surface 236. An elongated, helically flighted, axially rotatable screw section 238 is located within head section 232 and has a central shaft 240 with helical flighting 242 presenting flighting surfaces 244. In this case, however, the inlet ends 232a, 238a of the head section (because of the presence of sleeve 234) and screw section 232, 238 are larger than the corresponding output ends 232b, 238b. Accordingly, the surfaces 236 and 244 cooperatively define a generally frustoconical but converging flow path 246. The components of sections 212 and 214 are designed so that the diverging flow path 230 and converging flow path 246 are each oriented at 3°. As indicated, the die assembly 20 has a diverging 3° flow path 75 as well.

Figure 17:
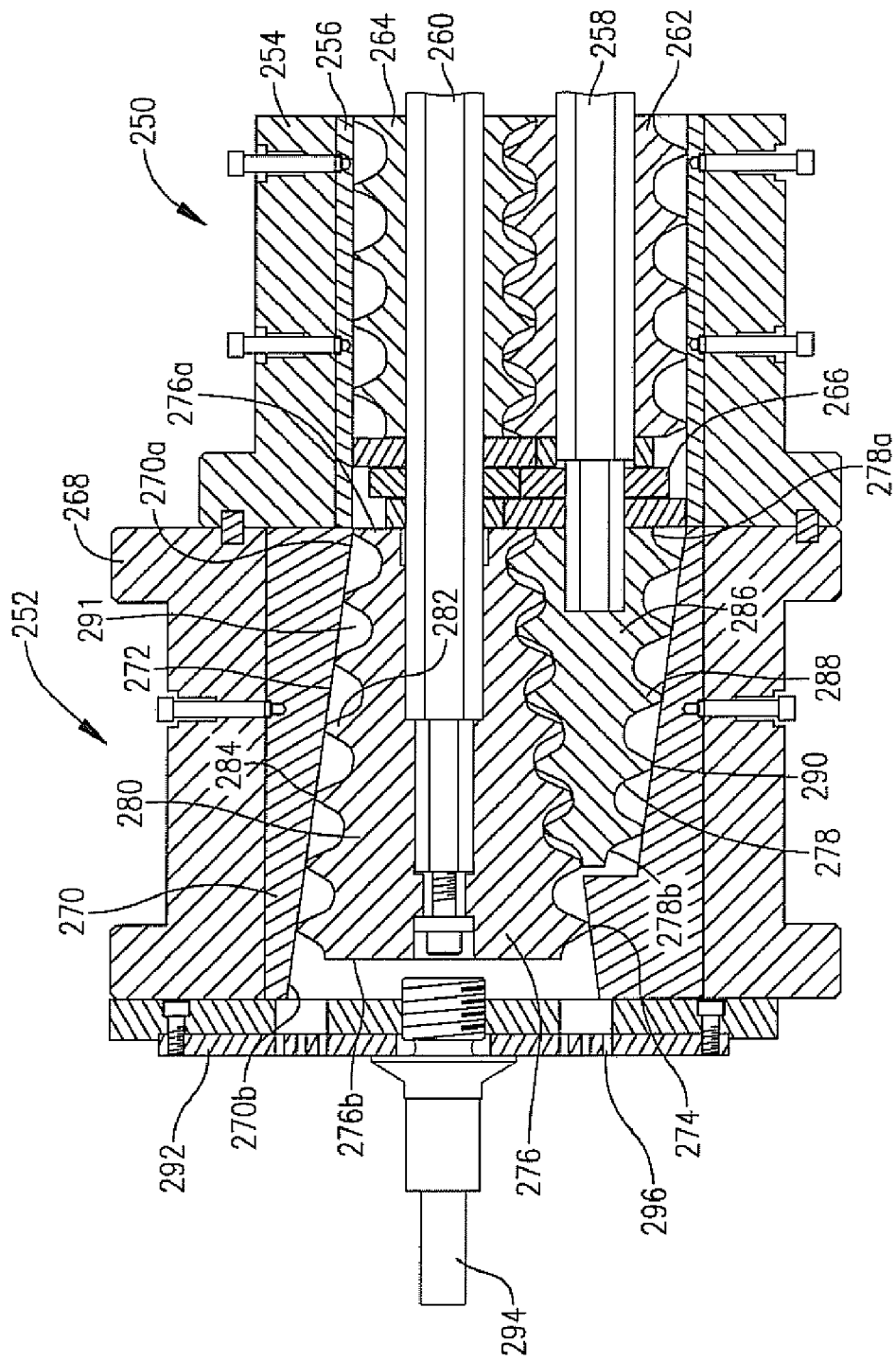
FIG. 17 is a vertical sectional view of a twin screw extruder equipped with a die assembly in accordance with the invention, wherein the screw section includes a pair of intercalated screw sections.

Embodiment of FIG. 17

Die Assembly for Twin Screw Extruders

The preceding embodiments have illustrated the use of die assemblies in accordance with the invention in the context of single screw extruders. However, the invention is not limited in this respect, and die assemblies embodying the principles of the invention can be fabricated for a use with twin screw extruders.

Referring to FIG. 17, a twin screw extruder 250 is illustrated, with a die assembly 252. The extruder 250 is itself conventional, and includes a tubular barrel terminating in a final head section 254 equipped with an internal, straight sleeve 256. A pair of side-by-side drive shafts 258, 260 are located within the extruder barrel and are powered for axial rotation. The shafts 258, 260 support a pair of juxtaposed, intercalated, axially rotatable, helically flighted screw assemblies, including terminal screw sections 262 and 264. A series of steam locks 266 may be mounted on shafts 258, 260 downstream of the screw sections 262, 264.

The die assembly 252 includes a tubular section 268 which is secured to the butt end of terminal extruder head section 254 and communicates with the tubular extruder barrel.

The tubular section 268 is equipped with a specialized sleeve 270 presenting a smooth inner surface 272 with a projection surface 274 on one side section thereof; both at a divergence angle of about 9°. The inlet end 268a of the tubular section 268 is larger than the output end 268b thereof.

The assembly 252 also includes a pair of screw sections 276, 278 within tubular section 268. The screw section 276 is mounted on drive shaft 260 and has a central shaft 280 with outwardly extending helical flighting 282 presenting outermost flighting surfaces 284. The inlet end 276a of the screw section 276 is smaller than the outlet end 276b thereof. The screw section 278 is mounted on drive shaft 258 and includes a central shaft 286 with outwardly extending helically flighting 288 presenting outer flighting surfaces 290. The inlet end 278a is larger than the outlet 278b. The axial length of screw section 278 is less than that of mating screw section 276. The flighting 282 of screw section 276 is intercalated with the flighting 288 of screw section 278, i.e., the flighting 282 extends past the outer surfaces 290 of the flighting 288, and vice versa. It will be seen that the outer flighting surfaces 284, 290, and the sleeve surface 272 cooperatively define a flow path 291 which diverges along the length of the die assembly 252.

The die assembly 252 includes a final die 292 having a central mounting stub shaft 294 and a series of restricted die openings 296 in communication with flow path 291. That is, material passing through the die assembly 252 diverges along the region between the flighting 282 of screw section 276 and surface 272, and also during passage between the intercalated flighting of screw sections 276, 278. Finally, material passing along the region between flighting 288 of screw section 278 and surfaces 272, 274 is likewise ultimately diverged outwardly by the outer end of projection surface 274. Accordingly, the net effect of die assembly 252 is to provide a desirable divergence of material flow in order to increase throughput through the extruder 250.

Figure 19:
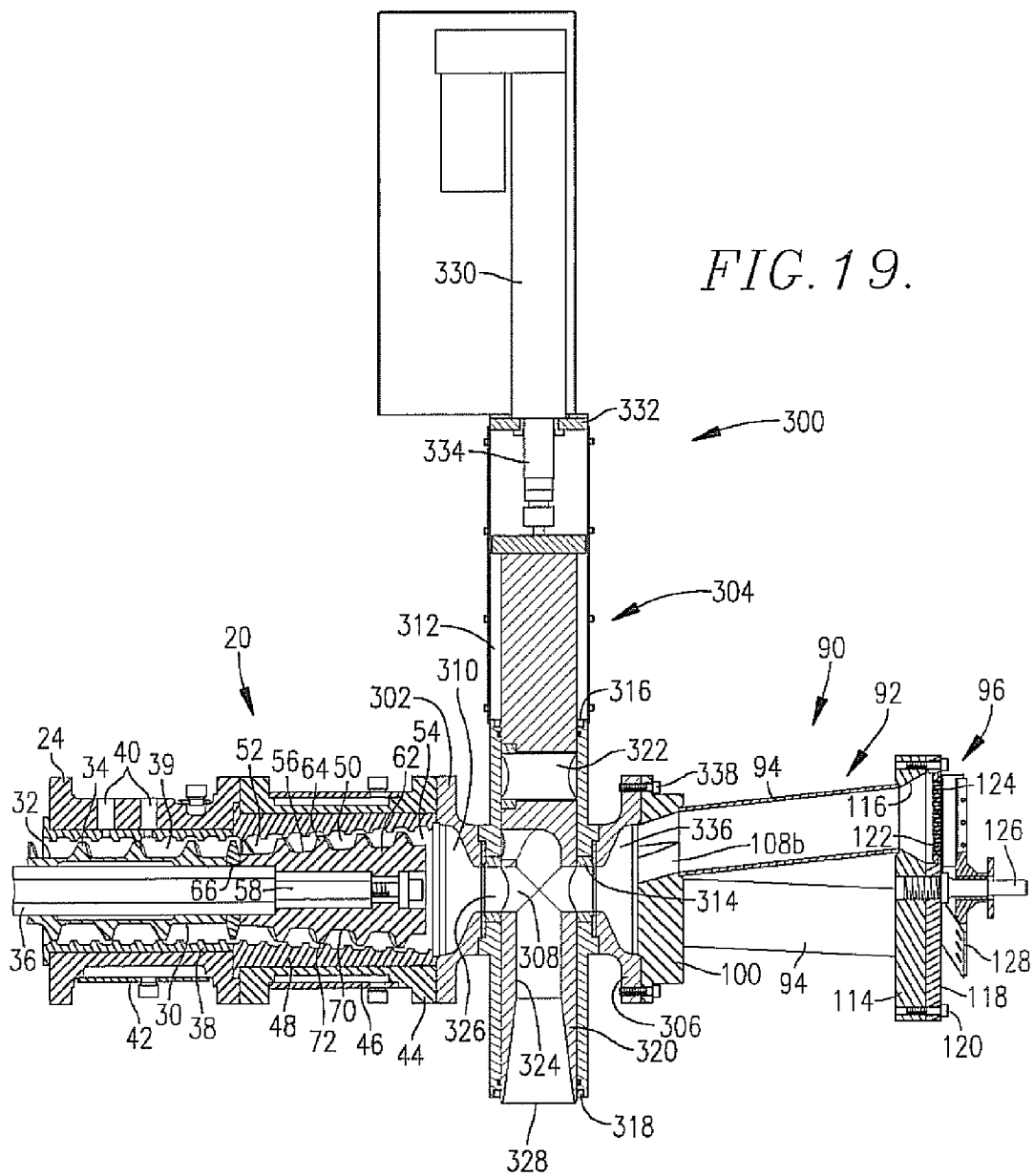
FIG. 19 is a fragmentary, vertical sectional view of a single screw extruder including the a die assembly of the type depicted in FIGS. 5-12, with a back pressure valve interposed between the outlet end of the extruder and the inlet end of the die assembly.

Embodiment of FIG. 19

Use of Back Pressure Valve Assembly Between Extruder and Die Assembly

Figure 4:
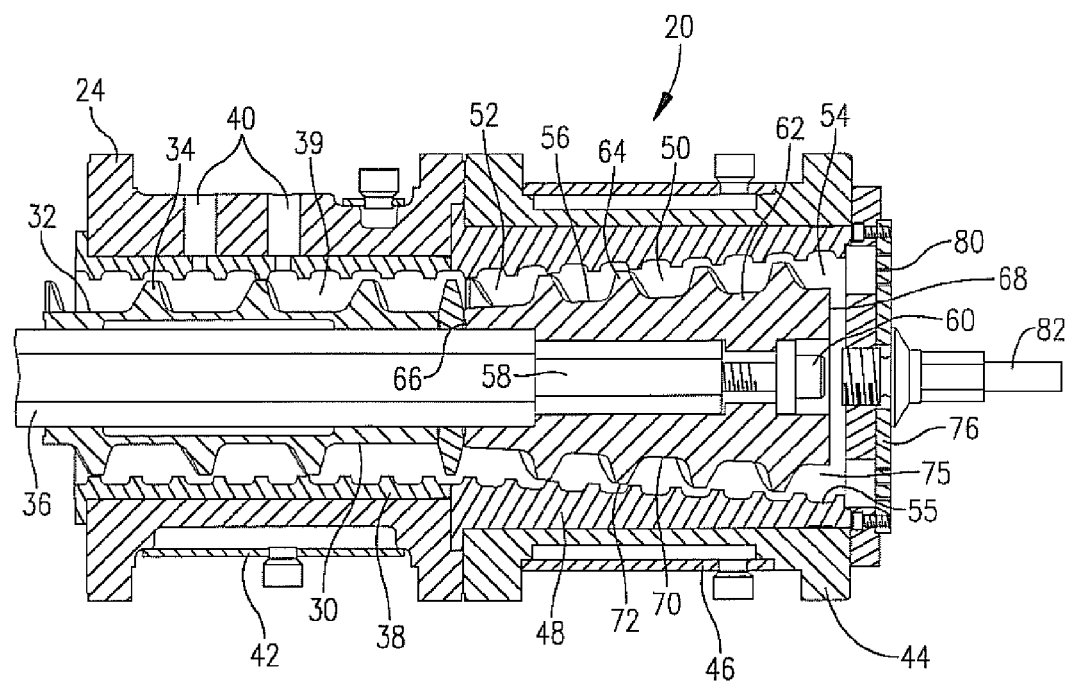
FIG. 4 is a vertical sectional view of the assembly of FIG. 1.
Figure 7:
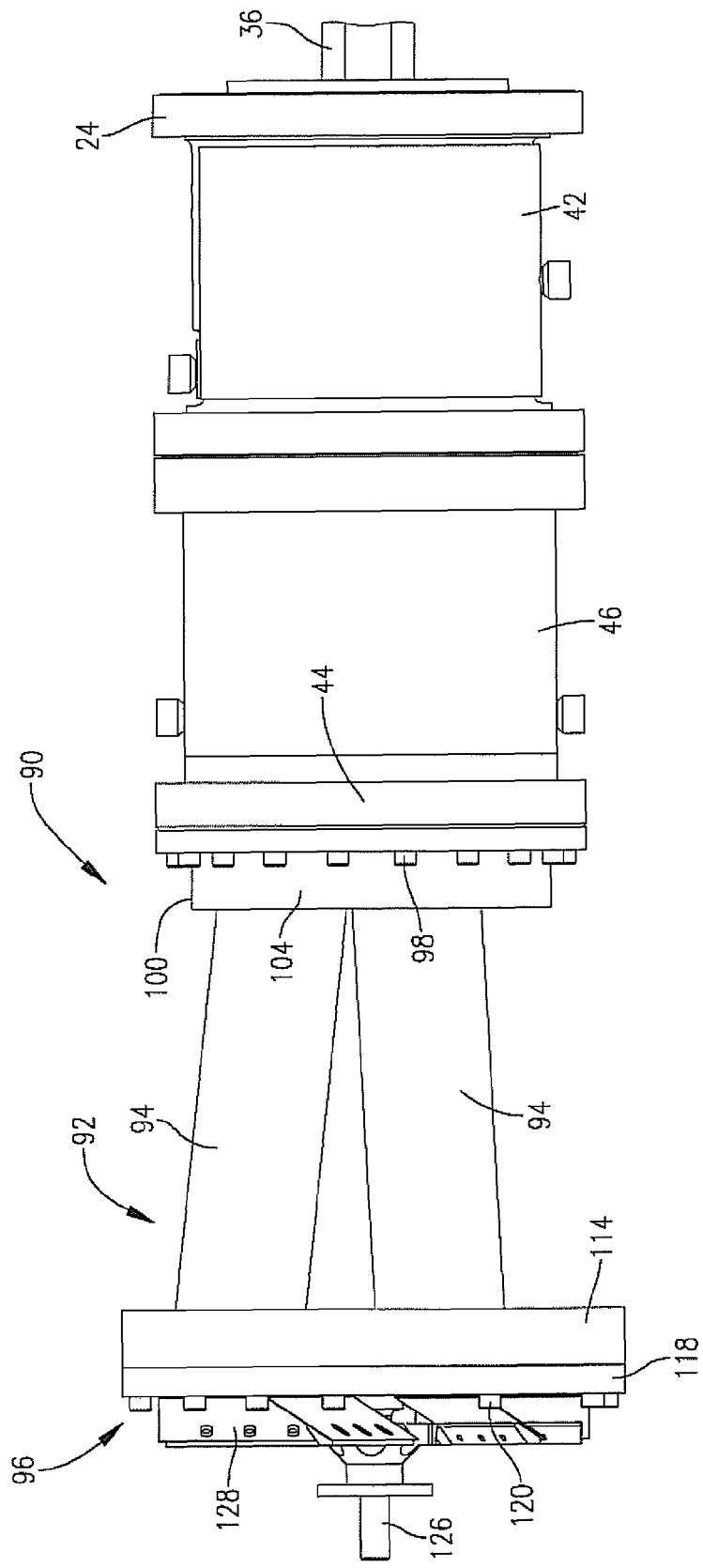
FIG. 7 is a side view with parts broken away of the assembly illustrated in FIG. 5.

FIG. 19 illustrates a single screw extruder having a final head 24, including a tubular section 44 and cooperating screw section 30, all as illustrated and described with reference to FIG. 4. Inasmuch as the sections 24 and 44 and the screw sections 30 and 56, are identical with the FIG. 4 embodiment, like reference numerals have been used in FIG. 19 and no further discussion components is required. Furthermore, the FIG. 19 embodiment makes use of a die assembly 90 as described in the embodiment of FIGS. 5-12. Here again, because the components of the die assembly 90 are identical with those of FIGS. 5-12, like reference numerals have been used.

The FIG. 19 embodiment differs from that of the earlier embodiments by use of a back pressure valve assembly 300 interposed between the tubular section 44 and die 90. Specifically, the assembly 300 is of the type fully illustrated and described in U.S. Pat. No. 6,773,739. The disclosure of that patent relating to the back pressure valve assembly 14 thereof is incorporated by reference herein.

The back pressure valve assembly 300 includes three interconnected components, namely inlet transition 302, valve unit 304, and outlet transition 306. These components are aligned end-to-end and cooperatively define a passageway 308 throughout the entirety of the assembly 300.

In more detail, the transition 302 is secured to the end of tubular section 44 and has a converging opening 310. The valve unit 304 includes an upright tubular segment 312 generally transverse to the longitudinal axis of passageway 308 and having a laterally extending opening 314; the upper and lower ends of the segment 312 include sealing rings 316 and 318. An elongated valve member 320 is situated and vertically reciprocal within segment 312. The valve member 320 includes a laterally extending through opening 322 as well as a product diversion passageway or channel 324 including an inlet opening 326 and outlet 328. The valve member 320 is selectively moveable within segment 312 by means of piston and cylinder assembly 330. In particular, the assembly 330 is supported by mounting block 332 secured to segment 312. The assembly 330 includes a reciprocal piston rod 334 secured to the upper end of valve member 320. The outlet transition 306 is secured to the outer face of segment 312 and has a diverging opening 336. The die assembly 90 is secured to the outlet face of transition 306 by means of bolts 338.

In operation, the back pressure valve assembly 300 may be operated to vary the pressure and cook conditions developed in the overall extruder/back pressure valve/die assembly. Specifically, the valve member 320 is shifted downwardly until opening 322 comes into registry with passageway 308. During extrusion, the effective cross-sectional area presented by the passageway 308 may be adjusted through appropriate operation of piston and cylinder assembly 330. Of course, the overall extruder and terminal sections 44 and 56 operate as previously described. Similarly, the die assembly 90 also operates as previously discussed.

Figure 20:
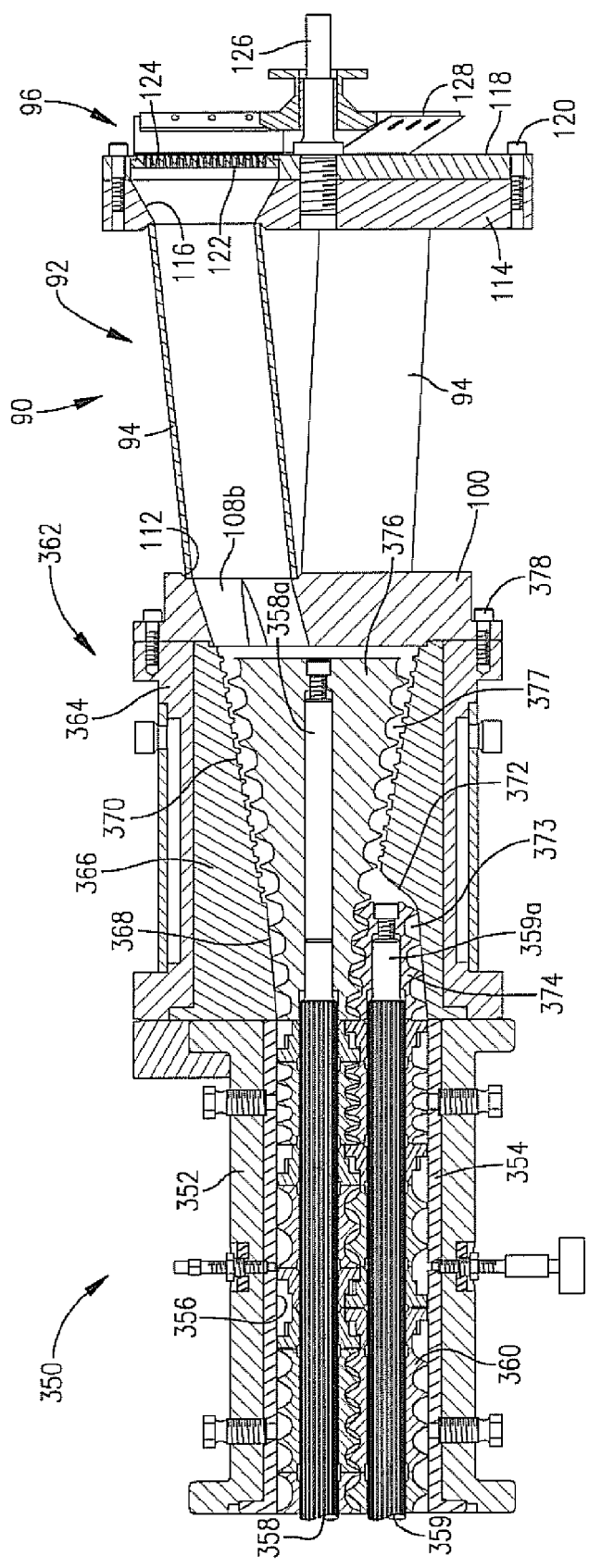
FIG. 20 is a fragmentary, vertical sectional view of a twin screw extruder of the type illustrated in FIG. 17, with the die assembly of FIGS. 5-12.
Figure 21:
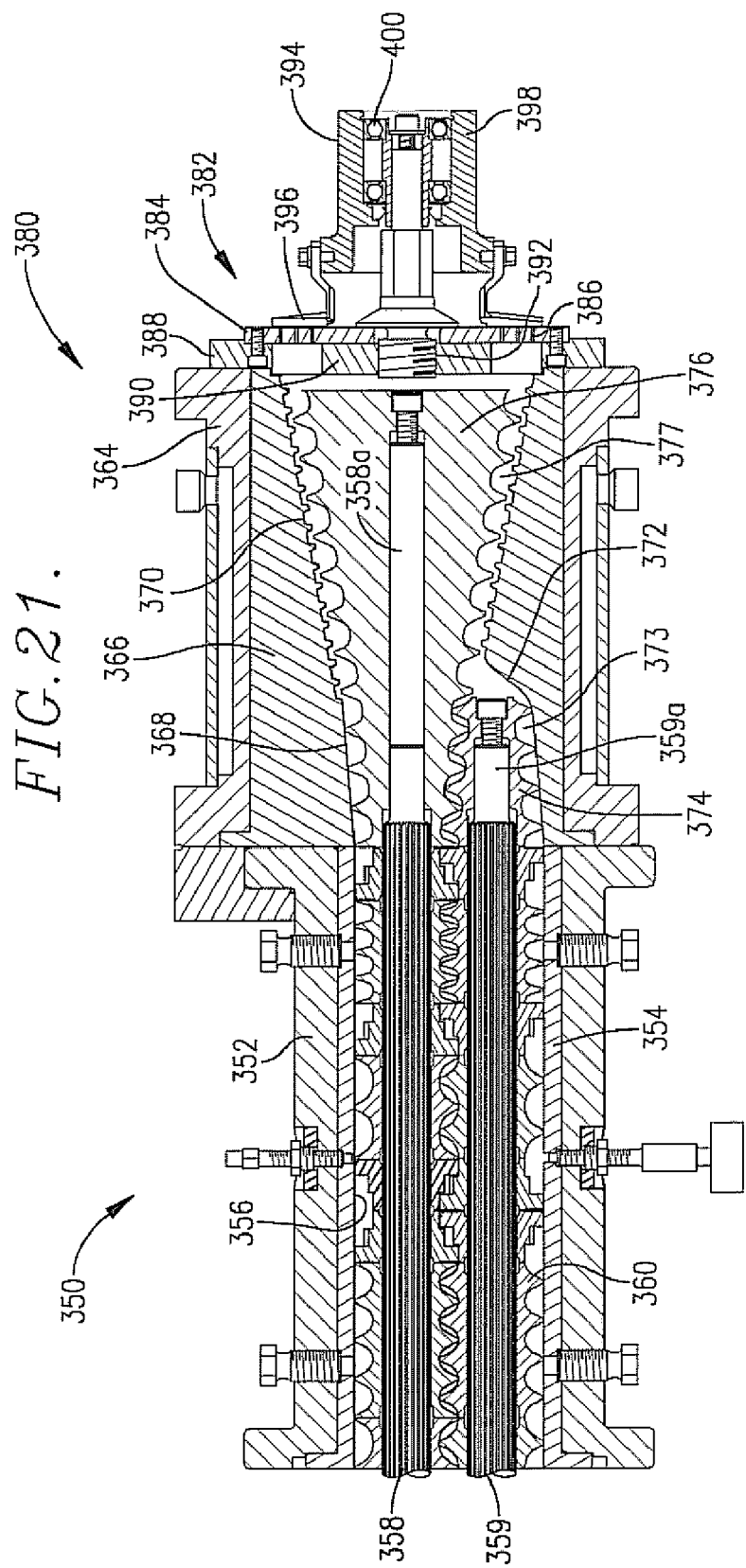
FIG. 21 is a fragmentary, vertical sectional view of the twin screw extruder of FIG. 20, with a die of the type illustrated in FIGS. 1-4.

Embodiments of FIGS. 20-21

Twin Screw Extruder with Low and High Density Product Die Assemblies

Turning now to FIGS. 20 and 21, a twin screw extruder assembly 350 is illustrated. In general, the assembly 350 is conventional and includes a multiple-section tubular barrel with a terminal head 352. The head includes an outer, smooth sleeve 354 defining an elongated bore 356 generally of figure eight configuration. Internally, the assembly 350 has a pair of elongated, laterally spaced apart, splined shafts 358 and 359. The shafts 358, 359 are powered by a motor and drive assembly (not shown) and support a series of elongated, helically flighted, intercalated screw sections generally referred to by the numeral 360 along the lengths thereof.

Referring particularly to FIG. 20, a die assembly 362 is depicted and is operatively connected to the terminal head section 352. The die assembly 362 includes a tubular section 364 secured to head 352 by bolts (not shown). Internally, the section 364 includes a specialized sleeve 366 presenting a smooth internal surface 368 which diverges outwardly relative to the longitudinal axis of section 364 at an angle of 5°. The sleeve 366 also includes a helically ribbed internal surface 370 which diverges outwardly from the longitudinal axis of section 364 at an angle of 10°. The surface 370 is essentially a continuation of surface 368, save for a transition surface 372 which provides a screw-receiving region 373.

It will be observed that the shaft 358 has a smooth, non-splined, relatively long extension 358*a* within sleeve 366, whereas shaft 359 includes a shorter, smooth, non-splined extension 359*a*. The extension 359*a* supports a short, converging screw section 374 within region 373. The extension 358*a* supports a diverging screw section 376 which extends substantially the entire length of the section 364. The helical flighting of screw sections 374 and 376 are intercalated along the length of the section 374, with the remainder of screw section 376 extending along the ribbed surface 370 of sleeve 366. It will be seen that the screw section 376 diverges in conformance with the surfaces 368 and 370, i.e., the portion of screw section 376 adjacent surface 368 diverges at an angle of 5°, whereas the remainder of the screw section diverges at an angle of 10°. Thus, it will be seen that cooperating screw sections 374 and 376, together with sleeve 366 cooperatively define a generally frustoconical, diverging flow path 377 along the length of the section 364.

In the embodiment of FIG. 20, a die assembly 90 as describe with reference to FIGS. 5-12, is secured to the outer end of tubular section 364 by means of bolts 378. Accordingly, the reference numerals used in the discussion of FIGS. 5-12 are likewise used to identify the die assembly components of this embodiment. In operation, material traveling along diverging flow path 377 passes into and through the die assembly 90 as previously described.

FIG. 21 includes a die assembly 380 which is identical with die assembly 362 except for the use of a different type of final die 382. Therefore, like reference numerals are used for the identical components of the die assemblies 362 and 380. The final die 382 includes a die plate 384 having a series of through-openings 386 arranged in a circular pattern and in proximity to the end of frustoconical flow path 377. The die plate 384 is secured to a mounting ring 388 affixed to the butt end of tubular section 366 and includes an internal, central block 390 having a threaded bore 392. A floating knife unit 394 is secured to die plate 384 and has a rotatable knife blade set 396. The set 396 is supported by a rotatable housing 398 which is supported on bearings 400, enabling the knife blade set to "float" during operation.

In the operation of the FIG. 21 embodiment, material passing along flow path 377 is extruded through the openings 386 with a pressure drop across these openings. The knife unit 394 serves to sever the extrudate passing through the openings 386 to size the product as desired.

EXAMPLES

The following examples set forth preferred apparatus and methods in accordance with the invention. It is to be understood, however, that these examples are provided by way of illustration only, and nothing therein should be taken as a limitation upon the overall scope of the invention.

Example 1

In this Example, micro-aquatic floating fish feeds were produced using a basic recipe including 50% by weight soybean meal, 22% by weight fish meal, 25% by weight wheat flour, 1% by weight calcium carbonate and 2% by weight salt.

The extrusion equipment included a Model 16 DDC Wenger preconditioner, and a 5-head Model X165 Wenger single screw extruder equipped with the die assembly of FIGS. 1-4. The die plate had a total of 504 1.8 mm diameter die holes.

Two separate runs were conducted using this recipe and equipment. In run 1, 1% of Menhaden fish oil was added to the material in the preconditioner. In run 2, there was no oil addition.

The following Table 1 sets forth the results from this series of tests.

TABLE 1

| RUN NUMBER | 1 | 2 |
|---|---|---|
| DRY RECIPE INFORMATION | | |
| Density (kg/m$^3$) | 585 | 585 |
| Feed Rate (kg/hr) | 3000 | 5000 |
| Feed Screw Speed (RPM) | 71 | — |
| PRECONDITIONING INFORMATION | | |
| Preconditioner Speed (RPM) | 250 | 250 |
| Steam Flow to Preconditioner (kg/hr) | 240 | 350 |
| Water Flow to Preconditioner (kg/hr) | 178 | 300 |
| Preconditioner Discharge Temp (° C.) | 86 | 61 |

TABLE 1-continued

| RUN NUMBER | 1 | 2 |
|---|---|---|
| EXTRUSION INFORMATION | | |
| Extruder Shaft Speed (RPM) | 540 | 540 |
| Extruder Motor Load (%) | 39 | 56 |
| Steam Flow to Extruder (kg/hr) | 150 | 200 |
| Water Flow to Extruder (kg/hr) | 58 | 500 |
| [1]Control/Temperature First Head (° C.) | 50/48 | 50/48 |
| [1]Control/Temperature Second Head (° C.) | 50/58 | 50/45 |
| [1]Control/Temperature Third Head (° C.) | 70/71 | 70/68 |
| [1]Control/Temperature Fourth Head (° C.) | 90/86 | 90/88 |
| [1]Control/Temperature Fifth Head (° C.) | 80/83 | 80/81 |
| Specific Mechanical Energy (SME) (kWhr/T) | 24.7 | — |

[1]Temperature control involved injection of cold water or steam into the external jackets of the extruder barrel.

The as-extruded density in runs 1 and 2 was 370 and 430 g/l, respectively. After drying the final product densities were 444 and 488 g/l, respectively. The run 1 product was 85% floating and the run 2 product was 60% floating. Both products exhibited excellent water stability.

Example 2

In this Example, micro-aquatic sinking fish feeds were produced using the same product recipe and equipment of Example 1, except that the die assembly of FIGS. 5-12 was employed. The three die inserts each had 1049 die holes of 1.5 mm diameter, for a total of 3147 die holes. A total of six runs were conducted, and Menhaden fish oil was added to the preconditioner in runs 1-3 at a level of 3% by weight, and in the remaining runs at a level of 5% by weight.

The following Table 2 sets for the results of these runs.

TABLE 2

| RUN NUMBER | 1 | 2 | 3 | 4 | 5 | 6 |
|---|---|---|---|---|---|---|
| DRY RECIPE INFORMATION | | | | | | |
| Density (kg/m$^3$) | 585 | 585 | 585 | 585 | 585 | 585 |
| Feed Rate (kg/hr) | 3009 | 3006 | 4771 | 5004 | 4841 | 5005 |
| Feed Screw Speed (RPM) | 70 | 70 | 123 | 133 | 128 | 129 |
| PRECONDITIONING INFORMATION | | | | | | |
| Preconditioner Speed (RPM) | 250 | 250 | 250 | 350 | 250 | 250 |
| Steam Flow to Preconditioner (kg/hr) | 241 | 239 | 350 | 350 | 250 | 250 |
| Water Flow to Preconditioner (kg/hr) | 175 | 188 | 293 | — | 596 | 613 |
| Preconditioner Discharge Temp (° C.) | 89 | 92 | 85 | 83 | 76 | 78 |
| EXTRUSION INFORMATION | | | | | | |
| Extruder Shaft Speed (RPM) | 420 | 300 | 300 | 300 | 420 | 540 |
| Extruder Motor Load (%) | 33 | 38 | 61 | 83 | 50 | 45 |
| Steam Flow to Extruder (kg/hr) | 120 | 60 | 101 | 100 | 101 | 100 |
| Water Flow to Extruder (kg/hr) | 120 | 306 | 495 | 485 | 502 | 512 |
| [1]Control/Temperature First Head (° C.) | 50/44 | 50/50 | 50/50 | 50/54 | 50/51 | 50/47 |
| [1]Control/Temperature Second Head (° C.) | 50/50 | 50/51 | 50/62 | 50/47 | 50/54 | 50/47 |
| [1]Control/Temperature Third Head (° C.) | 70/55 | 70/74 | 70/74 | 70/64 | 70/70 | 70/61 |
| [1]Control/Temperature Fourth Head (° C.) | 90/60 | 90/90 | 90/89 | 90/90 | 90/85 | 90/87 |
| [1]Control/Temperature Fifth Head (° C.) | 80/57 | 80/83 | 80/78 | 80/80 | 80/78 | 80/83 |
| Specific Mechanical Energy (SME) (kWhr/T) | 20.3 | 16.7 | 18.5 | 21.6 | 20.9 | 15.9 |
| FINAL PRODUCT INFORMATION | | | | | | |
| As-Extruded Density (g/l) | 630 | 640 | 630 | 618 | 630 | 640 |
| Dry Density (g/l) | 600 | 642 | 664 | 648 | 656 | 646 |
| Percent Floating (0% floating/seconds) | 0/30 | 0/20 | 0/15 | 0/25 | 0/20 | 0/30 |
| Water Stability (Hrs) | 10 | 10 | 8 | 3 | 3.5 | 3.5 |

[1]Temperature control involved injection of cold water or steam into the external jackets of the extruder barrel.

The products from Examples 1 and 2 had densities and water stabilities within industry standards for floating and sinking fish feeds. In terms of production rates, typical feed production rates for micro-aquatic feeds using a Wenger Model X165 extruder are in the range of 1-1.5 tons/hr. However, using the die assemblies of the invention, production rates of 5 tons/hr. or greater were achieved. These levels were achieved, which were the maximum rates possible using the feeder equipment associated with the extrusion systems. Greater throughputs could be achieved with upgraded feeder equipment.

We claim:

1. A high capacity extrusion die assembly comprising:
    an elongated tubular section having an axial length, an inlet end and an outlet end, with an internal bore presenting an axial length, and a longitudinal axis, and extending between said inlet end and said outlet end in a direction from said inlet end towards said outlet end;

an elongated, axially rotatable screw assembly within said tubular section and having first and second axially rotatable, intercalated screw members, said first screw member having an axial length, a first screw inlet end proximal to said tubular section inlet end, and a first screw outlet end proximal to said tubular section outlet end, the diameter of said first screw inlet end being different than the diameter of said first screw outlet end, said first screw member having outwardly extending first flighting presenting first flighting outer surfaces and extending between said first screw inlet end and said first screw outlet end, said second screw member having an axial length, a second screw inlet end proximal to said tubular section inlet end, and a second screw outlet end, the diameter of said second screw inlet end being different than the diameter of said second screw outlet end, said second screw member having outwardly extending second flighting presenting second flighting outer surfaces and extending between said second screw inlet end and said second screw outlet end, said first flighting outer surfaces diverging along the length thereof in said direction, and said second flighting outer surfaces converging along the length thereof in said direction, said first and second screw members having different axial lengths; and a die unit associated with said tubular section outlet end and having a plurality of die openings therethrough configured to create a pressure drop across the die openings.

2. The die assembly of claim 1, the longitudinal axes of said first and second screw members being parallel with each other and with the longitudinal axis of said tubular section.

3. The die assembly of claim 2, said bore having a first wall section proximal to said first flighting outer surfaces which diverges in said direction from said tubular section inlet end toward said tubular section outlet end.

4. The die assembly of claim 3, said first wall section progressively diverging at an angle of from abut 1-11° in said direction.

5. The die assembly of claim 4, said angle being from about 1.5-7°.

6. The die assembly of claim 2, said bore having a second wall section proximal to said second flighting outer surfaces which converges in a direction from said tubular section inlet end toward said tubular section outlet end.

7. The die assembly of claim 6, said second wall section converging at an angle of from about 1-11° in said direction.

8. The die assembly of claim 7, said angle being from about 1.5-7°.

9. The die assembly of claim 2, said die unit having a die plate spaced from the second screw outlet end a distance less than the diameter of said die plate.

10. The die assembly of claim 2, said tubular section bore presenting a first wall section proximal to said first flighting outer surfaces and a second wall section proximal to said second flighting outer surfaces, first and second wall surfaces each oriented at an angle in said direction, with portions of the first and second wall surfaces being parallel.

11. The die assembly of claim 1, said first screw inlet end and said second screw inlet end being of the same diameter.

12. The die assembly of claim 1, said die unit comprising at least one die plate having said die openings oriented substantially parallel of said direction.

13. The die assembly of claim 2, the central axis of said inlet end being radially offset from the central axis of said outlet end.

14. The die assembly of claim 2, the rotational axis of said first screw member being coincident with the central axis of said tubular section outlet end.

15. The die assembly of claim 2, said first screw member having an axial length greater than the axial length of the second screw member.

16. The die assembly of claim 2, including a sleeve located within said tubular section and presenting first and second surfaces respectively proximal to said first and second flighting outer surfaces.

17. The die assembly of claim 16, said first surface diverging in said direction at an angle of from about 1-11°, said second surface converging in said direction at an angle of from about 1-11°.

18. The die assembly of claim 16, said sleeve having a recess that receives said second screw member.

* * * * *